(12) United States Patent
Ichimura

(10) Patent No.: US 8,654,449 B2
(45) Date of Patent: Feb. 18, 2014

(54) ZOOM LENS AND IMAGE PROJECTION APPARATUS INCLUDING THE SAME

(71) Applicant: Canon Kabushiki Kaisha, Tokyo (JP)

(72) Inventor: Junya Ichimura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/766,427

(22) Filed: Feb. 13, 2013

(65) Prior Publication Data
US 2013/0155524 A1    Jun. 20, 2013

Related U.S. Application Data

(63) Continuation of application No. 13/149,348, filed on May 31, 2011, now Pat. No. 8,400,720.

(30) Foreign Application Priority Data

Jun. 9, 2010  (JP) ................................ 2010-131955
May 10, 2011  (JP) ................................ 2011-105632

(51) Int. Cl.
*G02B 15/14*  (2006.01)
*G02B 15/177*  (2006.01)

(52) U.S. Cl.
CPC .................... *G02B 15/177* (2013.01)
USPC ....................................................... 359/686

(58) Field of Classification Search
USPC .................. 359/771, 781–783, 686, 680–682
See application file for complete search history.

(56) References Cited

U.S. PATENT DOCUMENTS 6,580,564 B2 *  6/2003  Nagahara ...................... 359/683
7,016,118 B2    3/2006  Wada
(Continued)

FOREIGN PATENT DOCUMENTS

| CN | 101276048 A | 10/2008 |
| JP | 2008052174 A | 3/2008 |
| JP | 2008158159 A | 7/2008 |
| JP | 2008216880 A | 9/2008 |

OTHER PUBLICATIONS

Office Action issued Jan. 5, 2013 in Chinese Application No. 201110148074 (Cited in parent US 2011/0304922).

*Primary Examiner* — Scott J Sugarman
*Assistant Examiner* — Robert E Tallman
(74) *Attorney, Agent, or Firm* — Rossi, Kimms & McDowell LLP

(57) ABSTRACT

Provided is a zoom lens, including in order from a magnification conjugate side to a reduction conjugate side: a first lens unit having a negative refractive power; a second lens unit having a positive refractive power; a third lens unit having a positive refractive power; a fourth lens unit having a negative refractive power; a fifth lens unit having a negative refractive power; and a sixth lens unit having a positive refractive power. The first and sixth lens units do not move for zooming, while the second to fifth lens units move to the magnification conjugate side during zooming from a wide-angle end to a telephoto end. Each of the second and third lens units is composed of a single positive lens. Movement amounts of the second, third and fourth lens units during zooming from the wide-angle end to the telephoto end satisfy appropriate relationships.

4 Claims, 11 Drawing Sheets

(56) References Cited

U.S. PATENT DOCUMENTS

| | | |
|---|---|---|
| 7,545,578 B2 | 6/2009 | Sugita |
| 7,567,389 B2 * | 7/2009 | Souma ........................ 359/682 |
| 2002/0060858 A1 | 5/2002 | Wada |
| 2006/0061872 A1 | 3/2006 | Yamasaki |
| 2007/0285802 A1 | 12/2007 | Sugita |
| 2008/0239507 A1 | 10/2008 | Sugita |
| 2009/0073572 A1 | 3/2009 | Atsuumi |
| 2009/0135497 A1 | 5/2009 | Nagahara |
| 2010/0149653 A1 * | 6/2010 | Wada ........................... 359/682 |
| 2010/0165477 A1 * | 7/2010 | Nagahara ..................... 359/682 |
| 2011/0304922 A1 | 12/2011 | Ichimura |

\* cited by examiner

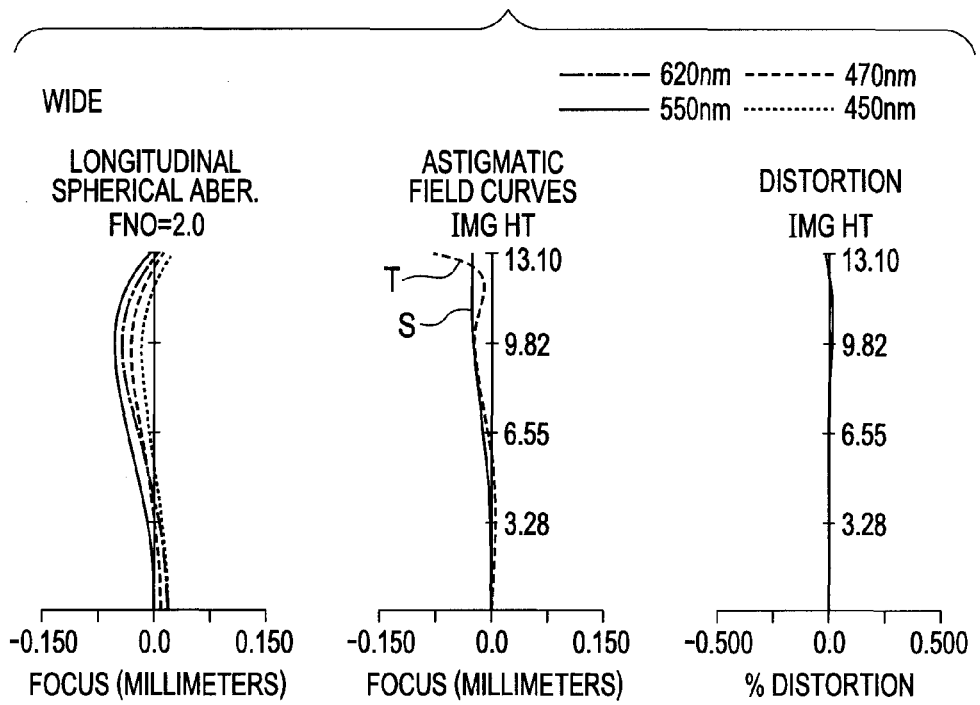
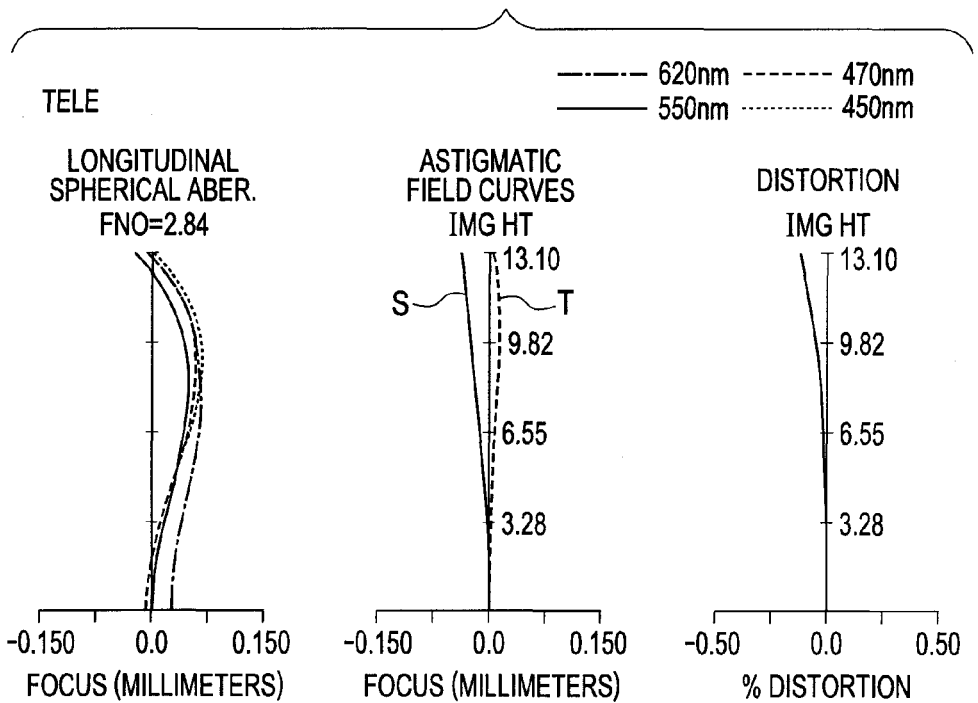

ZOOM LENS AND IMAGE PROJECTION APPARATUS INCLUDING THE SAME

BACKGROUND OF THE INVENTION

1. Field of the Invention

The present invention relates to a zoom lens, which is suitable, for example, as a projection lens used for an image projection apparatus (projector) that magnifies and projects an image onto a screen.

2. Description of the Related Art

The image projection apparatus (projector) that can project an image from a personal computer or a video apparatus onto a large screen is used widely for presentation, movie appreciation and the like.

Among projection apparatuses, a so-called installation type projector is widely used, which is fixedly installed in a conference room, a movie theater or the like. In order that the fixed installation type projector adjusts to various installation conditions, it is desired that the projector be an interchangeable projection lens type projector in which multiple projection lenses can be interchanged for the same main body.

In the interchangeable projection lens projector, the position of a light bulb in the optical axis direction is determined by a standard projection lens. Therefore, for the other interchangeable projection lenses, it is necessary to adjust the axial chromatic aberration in conformity with the standard projection lens.

For the reason described above, the projection lens that is used for an interchangeable projection lens projector or the like is required to have small axial chromatic aberration. In addition, in recent years, the projection lens has been required to be a zoom lens having a high zoom ratio for the purpose of covering a large projection distance range with a smaller number of lenses. In general, when a high zoom ratio is ensured, a variation of axial chromatic aberration is increased in zooming.

In order to reduce the variation of axial chromatic aberration in zooming, there is known a zoom lens composed of lens units each configured to be achromatic by itself (US 2002/0060858).

In order to reduce the total length of the lens system while ensuring a high zoom ratio, there is known a zoom lens for a projector, which is constituted by total six lens units including lens units each constituted by a single positive lens having a large refractive power for varying magnification (US 2007/0285802, and Japanese Patent Application Laid-Open No. 2008-052174).

The zoom lens that is used for a projector is required to have a high zoom ratio and little axial chromatic aberration so that a projected image having high image quality can be obtained. In addition, the zoom lens that is used for a projector is required to have a long back focus to dispose a color separation/combination prism therein.

In order to satisfy the requirements, it is important to appropriately set refractive powers of multiple lens units constituting the zoom lens, movement amounts of the lens units for zooming, and materials of lenses constituting the lens units. If these factors are inappropriate, it becomes difficult to ensure a predetermined length of the back focus and to reduce a variation of axial chromatic aberration for zooming with a high zoom ratio so as to obtain high optical performance.

SUMMARY OF THE INVENTION

A zoom lens according to the present invention includes in order from a magnification conjugate side to a reduction conjugate side: a first lens unit having a negative refractive power; a second lens unit having a positive refractive power; a third lens unit having a positive refractive power; a fourth lens unit having a negative refractive power; a fifth lens unit having a negative refractive power; and a sixth lens unit having a positive refractive power, in which: the first lens unit and the sixth lens unit do not move for zooming, while the second lens unit, the third lens unit, the fourth lens unit and the fifth lens unit move to the magnification conjugate side during zooming from a wide-angle end to a telephoto end; each of the second lens unit and the third lens unit is composed of a single positive lens; and the following conditional expressions are satisfied:

$$0.8 < D3/D4 < 1.2;$$

$$1.2 < D3/D2 < 2.0; \text{ and}$$

$$0.2 < D4/L < 0.4,$$

where D2, D3 and D4 represent movement amounts of the second lens unit, the third lens unit and the fourth lens unit during zooming from the wide-angle end to the telephoto end, respectively, and L represents a lens length.

Further features of the present invention will become apparent from the following description of exemplary embodiments with reference to the attached drawings.

BRIEF DESCRIPTION OF THE DRAWINGS

FIG. 3A is an aberration diagram at a wide-angle end of Embodiment 1 of the present invention.

FIG. 3B is an aberration diagram at a telephoto end of Embodiment 1 of the present invention.

DESCRIPTION OF THE EMBODIMENTS

Hereinafter, exemplary embodiments of the present invention are described in detail with reference to the attached drawings.

A zoom lens of the present invention includes the following lens units disposed in order from a magnification conjugate side to a reduction conjugate side. Specifically, there are disposed a first lens unit having a negative refractive power, a second lens unit having a positive refractive power, a third lens unit having a positive refractive power, a fourth lens unit having a negative refractive power, a fifth lens unit having a negative refractive power, and a sixth lens unit having a positive refractive power.

Then, the first lens unit and the sixth lens unit do not move for zooming, while the second to fifth lens units move to the magnification conjugate side from a wide-angle end to a telephoto end in zooming.

Each of the second lens unit and the third lens unit is formed of a single positive lens. Thus, a predetermined length of the back focus is obtained so that the zoom lens can be obtained which has little fluctuation of axial chromatic aberration in zooming with a high zoom ratio and is able to obtain high optical performance over the entire zoom range.

Figure 1:
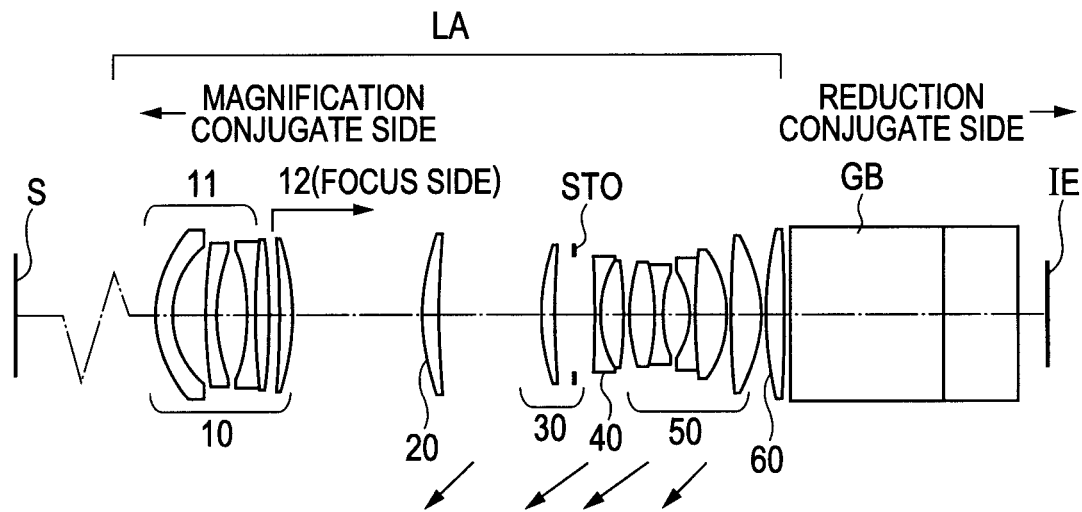
FIG. 1 is a lens cross-sectional view of Embodiment 1 of the present invention.

FIG. 1 is a lens cross-sectional view of a zoom lens of Embodiment 1 of the present invention at the wide-angle end (WIDE).

Figure 2:
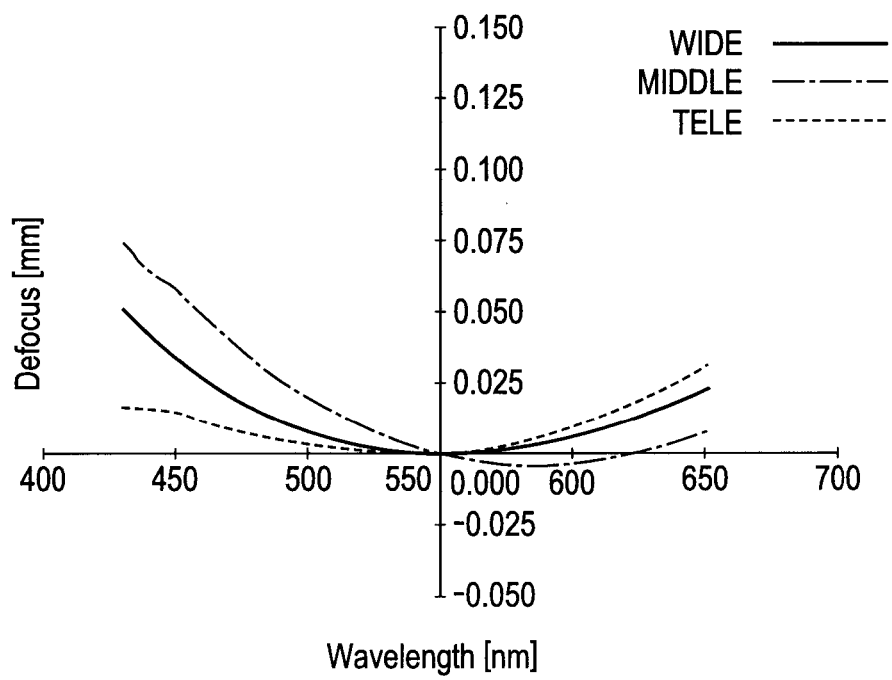
FIG. 2 is an explanatory diagram of axial chromatic aberration of Embodiment 1 of the present invention.

FIG. 2 is an explanatory diagram of the axial chromatic aberration of the zoom lens of Embodiment 1 of the present invention with respect to the wavelength at the wide-angle end, an intermediate zoom position (MIDDLE) and the telephoto end (TELE).

In FIG. 2, the horizontal axis indicates the wavelength, and the vertical axis indicates the axial chromatic aberration as defocus (the same is true in the following description).

FIGS. 3A and 3B are longitudinal aberration diagrams of the zoom lens of Embodiment 1 at the wide-angle end and the telephoto end when the projection distance (that is a distance from the first lens surface) is 3.29 m (that is a distance when Numerical Embodiment is indicated by mm; the same is true in the following description).

Figure 4:
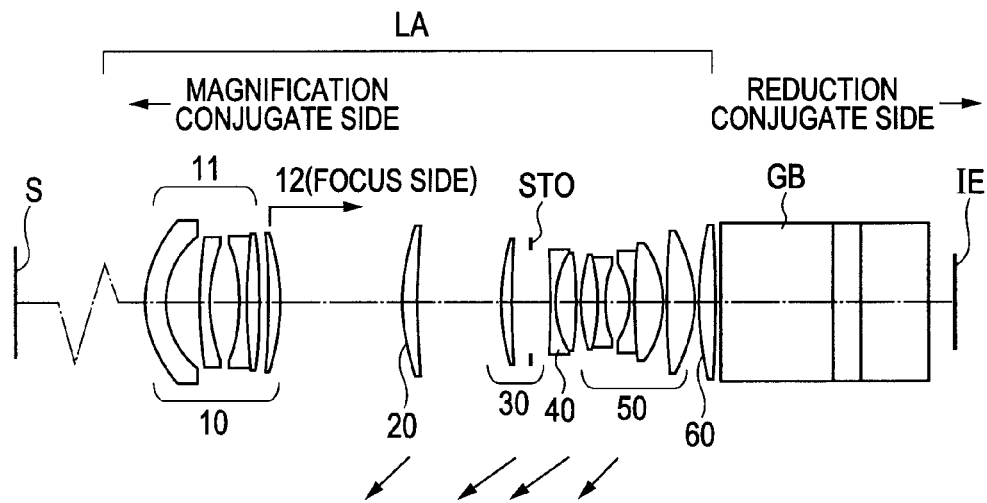
FIG. 4 is a lens cross-sectional view of Embodiment 2 of the present invention.

FIG. 4 is a lens cross-sectional view of a zoom lens of Embodiment 2 of the present invention at the wide-angle end.

Figure 5:
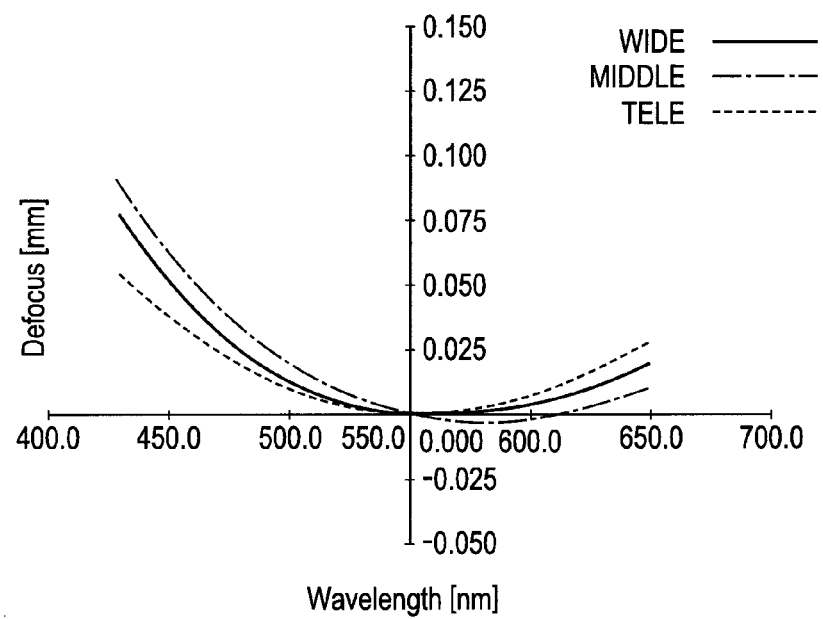
FIG. 5 is an explanatory diagram of axial chromatic aberration of Embodiment 2 of the present invention.

FIG. 5 is an explanatory diagram of the axial chromatic aberration of the zoom lens of Embodiment 2 of the present invention with respect to the wavelength at the wide-angle end, the intermediate zoom position and the telephoto end.

Figure 6A:
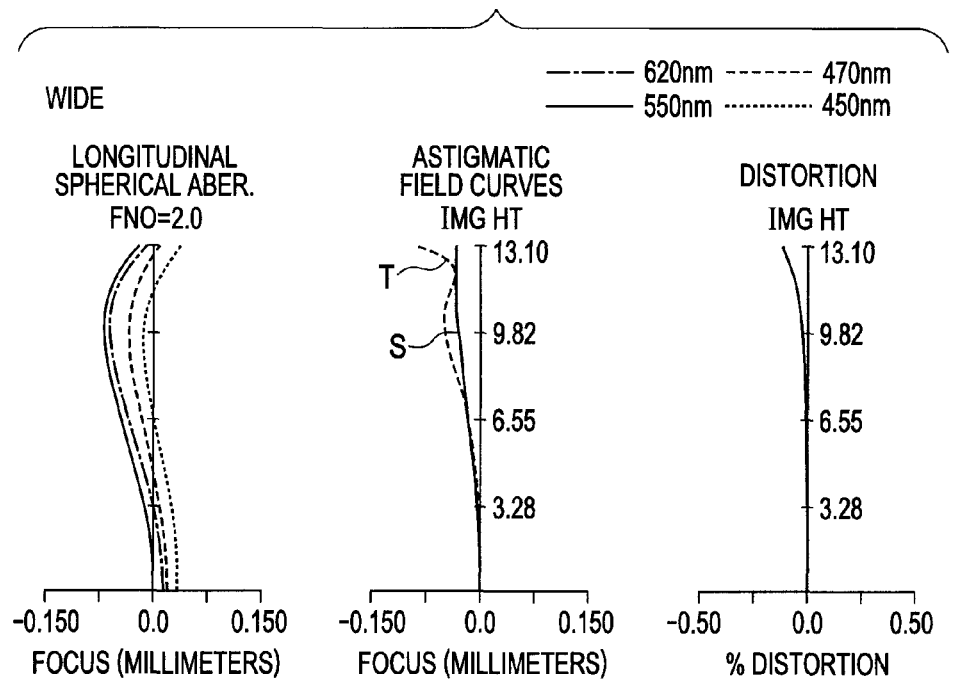
FIG. 6A is an aberration diagram at the wide-angle end of Embodiment 2 of the present invention.
Figure 6B:
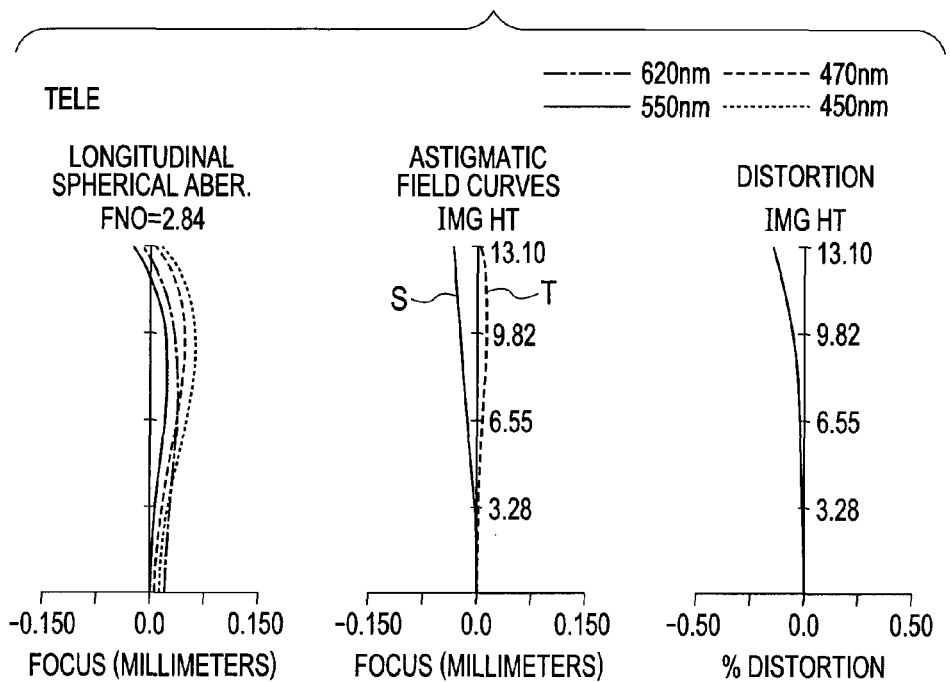
FIG. 6B is an aberration diagram at the telephoto end of Embodiment 2 of the present invention.

FIGS. 6A and 6B are longitudinal aberration diagrams of the zoom lens of Embodiment 2 at the wide-angle end and the telephoto end when the projection distance is 3.29 m.

Figure 7:
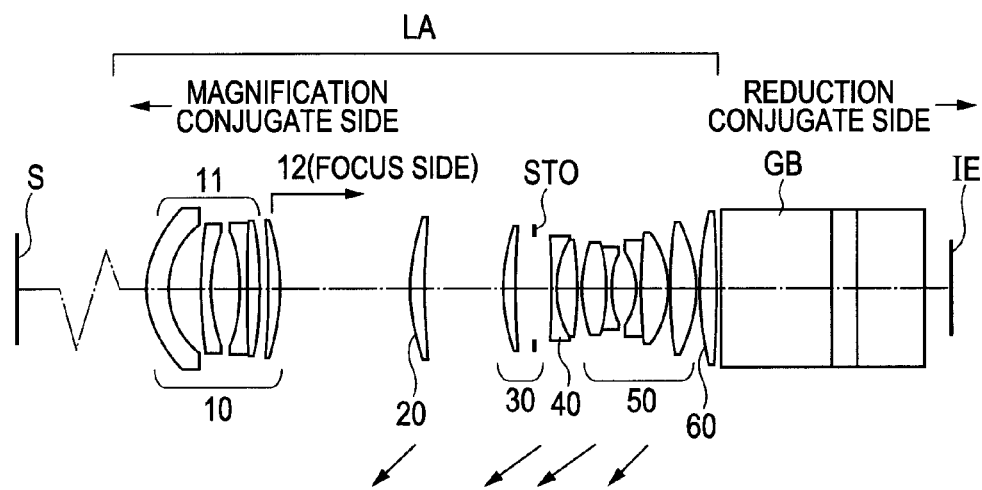
FIG. 7 is a lens cross-sectional view of Embodiment 3 of the present invention.

FIG. 7 is a lens cross-sectional view of a zoom lens of Embodiment 3 of the present invention at the wide-angle end.

Figure 8:
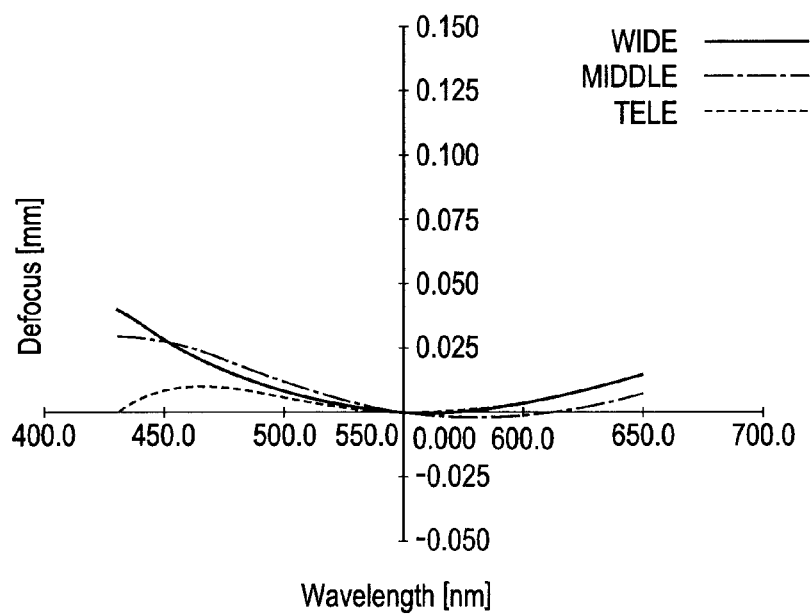
FIG. 8 is an explanatory diagram of axial chromatic aberration of Embodiment 3 of the present invention.

FIG. 8 is an explanatory diagram of the axial chromatic aberration of the zoom lens of Embodiment 3 of the present invention with respect to the wavelength at the wide-angle end, the intermediate zoom position and the telephoto end.

Figure 9A:
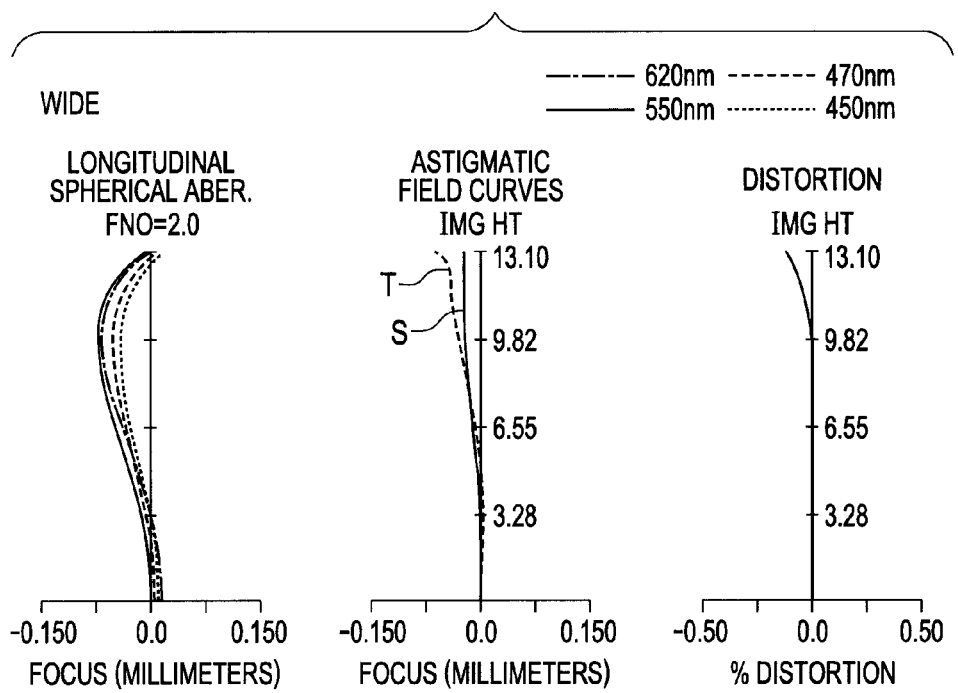
FIG. 9A is an aberration diagram at the wide-angle end of Embodiment 3 of the present invention.
Figure 9B:
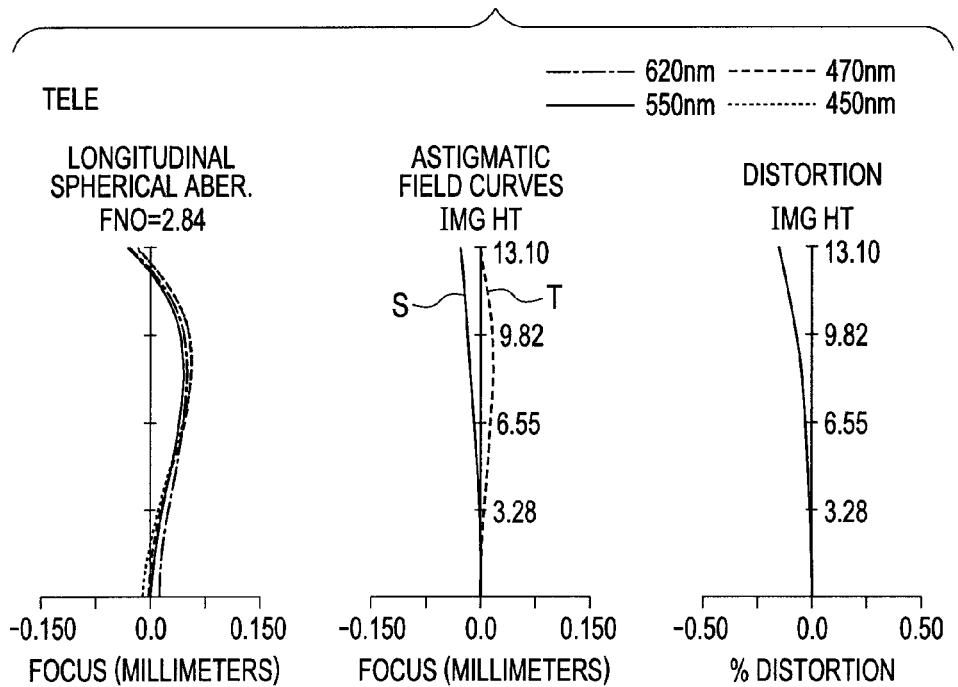
FIG. 9B is an aberration diagram at the telephoto end of Embodiment 3 of the present invention.

FIGS. 9A and 9B are longitudinal aberration diagrams of the zoom lens of Embodiment 3 at the wide angle end and the telephoto end when the projection distance is 3.29 m.

Figure 10:
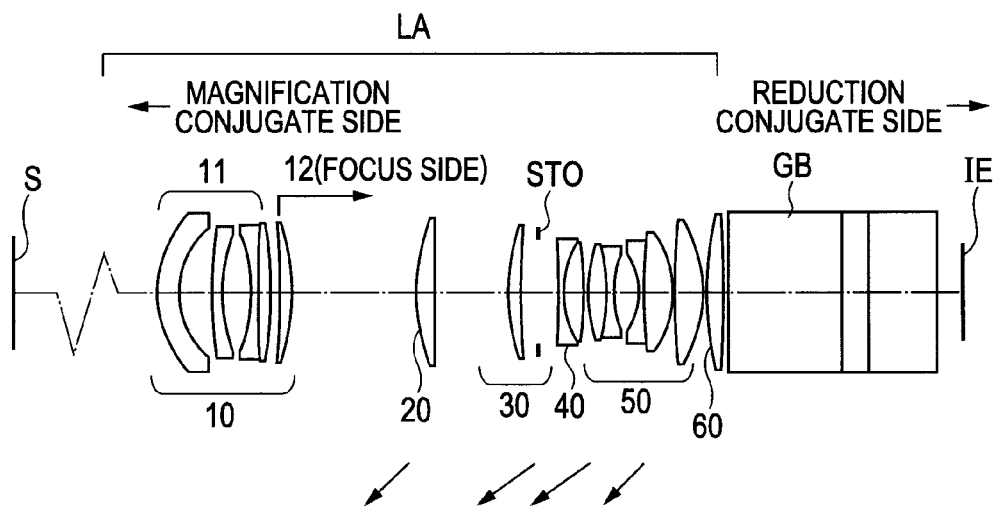
FIG. 10 is a lens cross-sectional view of Embodiment 4 of the present invention.

FIG. 10 is a lens cross-sectional view of a zoom lens of Embodiment 4 of the present invention at the wide-angle end.

Figure 11:
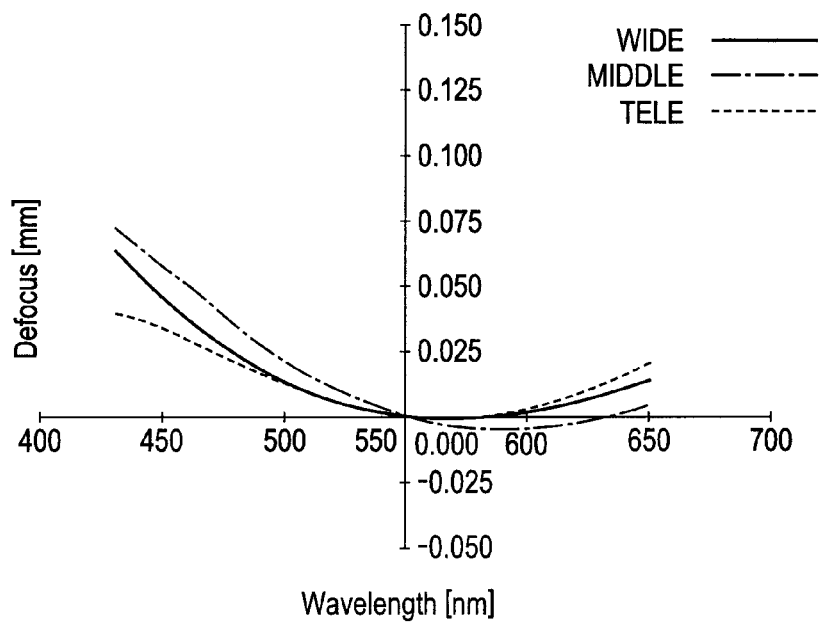
FIG. 11 is an explanatory diagram of axial chromatic aberration of Embodiment 4 of the present invention.

FIG. 11 is an explanatory diagram of the axial chromatic aberration of the zoom lens of Embodiment 4 of the present invention with respect to the wavelength at the wide-angle end, the intermediate zoom position and the telephoto end.

Figure 12A:
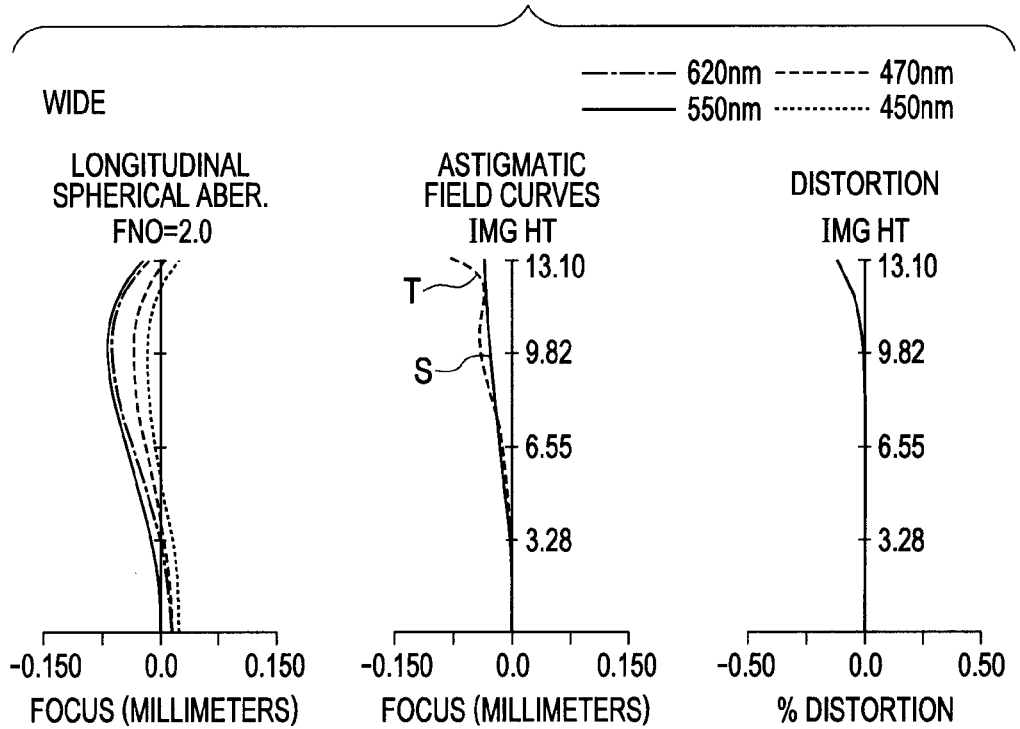
FIG. 12A is an aberration diagram at the wide-angle end of Embodiment 4 of the present invention.
Figure 12B:
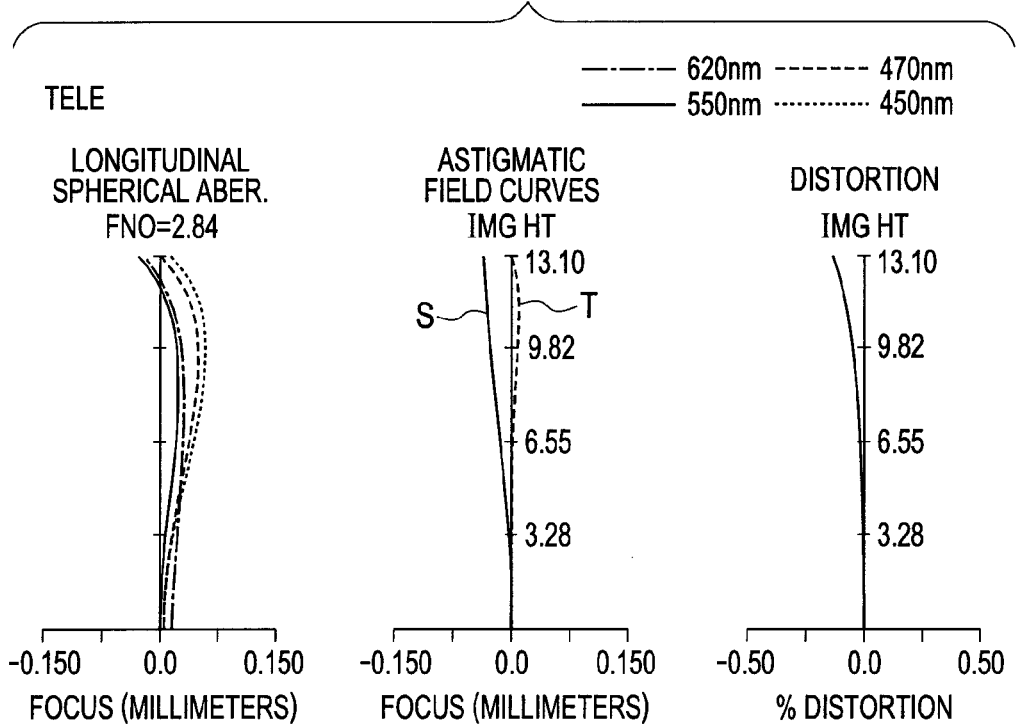
FIG. 12B is an aberration diagram at the telephoto end of Embodiment 4 of the present invention.

FIGS. 12A and 12B are longitudinal aberration diagrams of the zoom lens of Embodiment 4 at the wide angle end and the telephoto end when the projection distance is 3.29 m.

Figure 13:
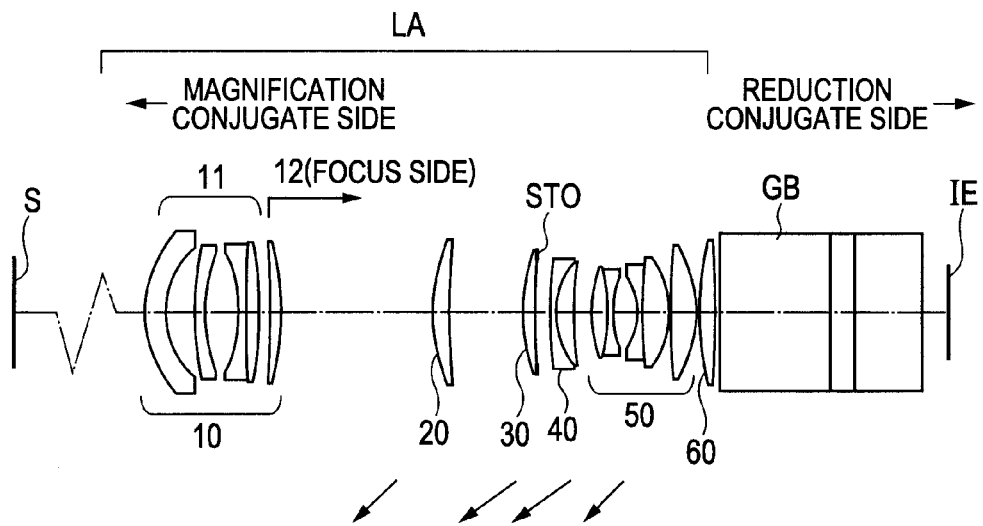
FIG. 13 is a lens cross-sectional view of Embodiment 5 of the present invention.

FIG. 13 is a lens cross-sectional view of a zoom lens of Embodiment 5 of the present invention at the wide-angle end.

Figure 14:
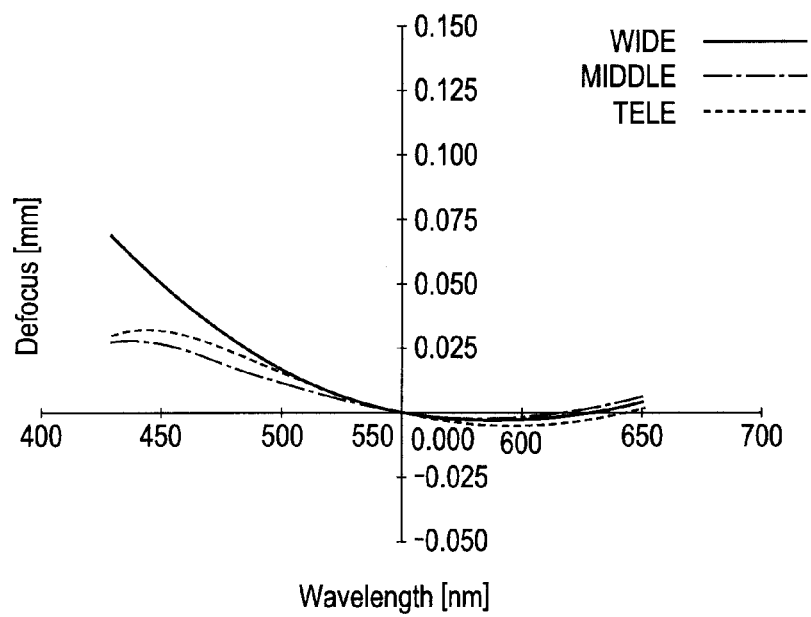
FIG. 14 is an explanatory diagram of axial chromatic aberration of Embodiment 5 of the present invention.

FIG. 14 is an explanatory diagram of the axial chromatic aberration of the zoom lens of Embodiment 5 of the present invention with respect to the wavelength at the wide-angle end, the intermediate zoom position and the telephoto end.

Figure 15A:
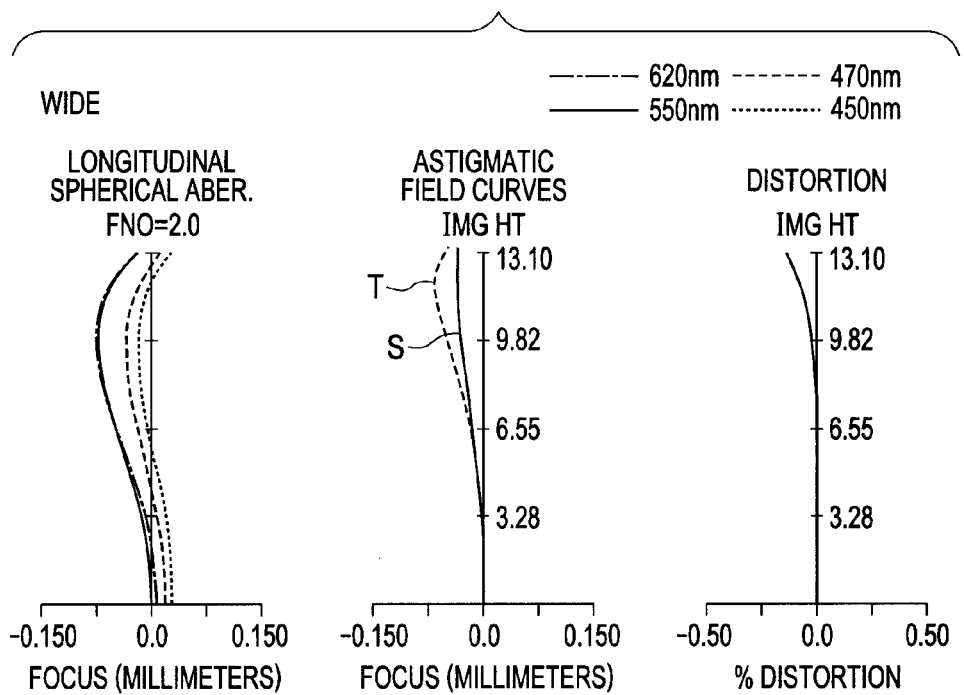
FIG. 15A is an aberration diagram at the wide-angle end of Embodiment 5 of the present invention.
Figure 15B:
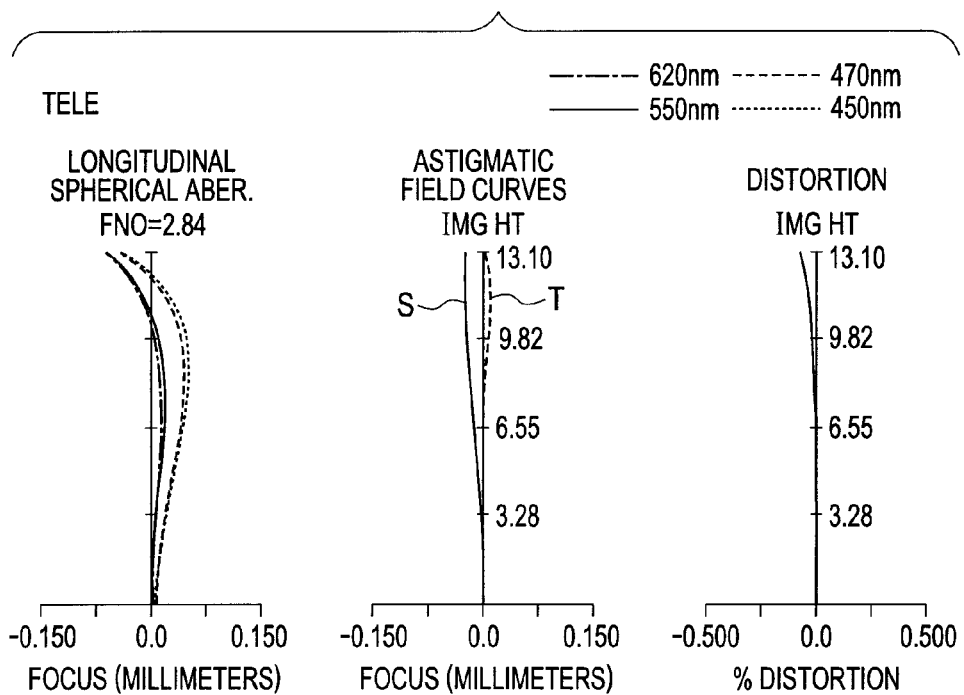
FIG. 15B is an aberration diagram at the telephoto end of Embodiment 5 of the present invention.

FIGS. 15A and 15B are longitudinal aberration diagrams of the zoom lens of Embodiment 5 at the wide-angle end and the telephoto end when the projection distance is 3.29 m.

Figure 16:
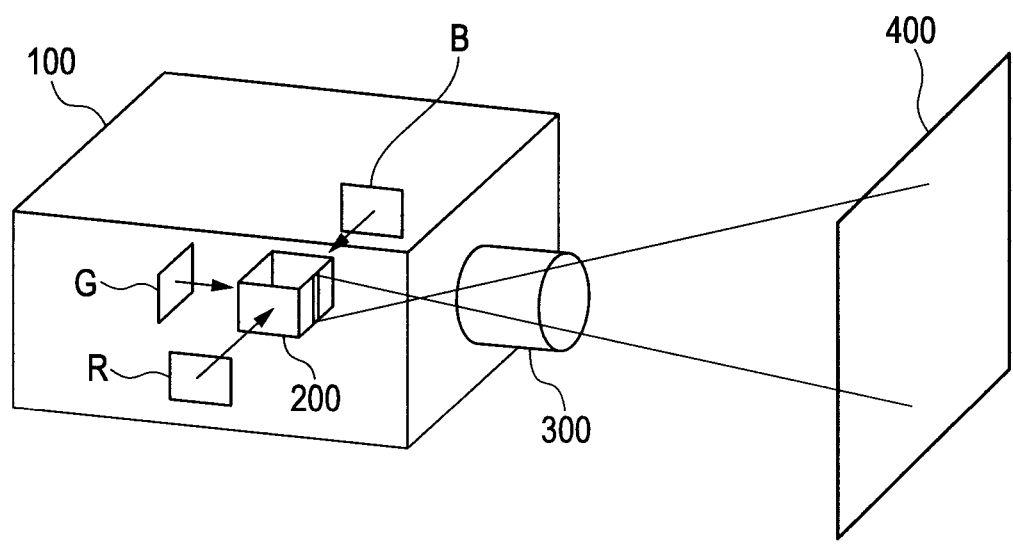
FIG. 16 is an explanatory diagram of an image projection apparatus of the present invention.

FIG. 16 is a schematic diagram of a main part of an image projection apparatus including the zoom lens of the present invention.

The zoom lens of each Embodiment is a projection lens (projection optical system) that is used for an image projection apparatus (projector). In the lens cross-sectional view, the left side is the magnification conjugate side (screen) (front), and the right side is the reduction conjugate side (image display element side) (rear).

The projection lens includes a zoom lens LA, an aperture stop STO, an original image IE (to be projected) of a liquid crystal panel (image display element) or the like, a screen S, and an optical block GB corresponding to a color separation/combination prism, an optical filter, a face plate (parallel flat glass), a crystal low-pass filter, an infrared cut filter or the like. The arrows indicate moving directions (moving loci) of the lens units in zooming from the wide-angle end to the telephoto end. The wide-angle end and the telephoto end indicate zoom positions when the lens unit for varying magnification is positioned at each end of the mechanically movable range on the optical axis.

The zoom lens in each Embodiment includes, in order from the magnification conjugate side to the reduction conjugate side, a first lens unit 10 having a negative refractive power, a second lens unit 20 having a positive refractive power, a third lens unit 30 having a positive refractive power and the aperture stop STO. Further, the zoom lens includes a fourth lens unit 40 having a negative refractive power, a fifth lens unit 50 having a negative refractive power and a sixth lens unit 60 having a positive refractive power. Then, the first lens unit 10 and the sixth lens unit 60 do not move for zooming. The second to fifth lens units 20 to 50 move to the magnification conjugate side for zooming from the wide-angle end to the telephoto end.

The first lens unit 10 and the sixth lens unit 60 are lens units that do not contribute to magnification-varying, and the second to fifth lens units 20 to 50 are the lens units for varying magnification.

The first lens unit 10 includes a first lens sub unit 11 which is fixed and a second lens sub unit 12 having a positive refractive power that moves to the reduction conjugate side in focusing on an object at a close distance from an object at infinite position.

In the aberration diagram, F-number is denoted by Fno, and the spherical aberration diagram (LONGITUDINAL SPHERICAL ABER) is illustrated for a wavelength of 450 nm, a wavelength of 470 nm, a wavelength of 550 nm and a wavelength of 620 nm.

In the astigmatism diagram (ASTIGMATIC FIELD CURVES), a meridional image plane is denoted by T, and a sagittal image plane is denoted by S.

A distortion diagram (DISTORTION) is illustrated for a wavelength of 550 nm.

A height of image is denoted by IMGHT.

Each Embodiment is a zoom lens that is used for an image projection apparatus including a light bulb (in particular, a three-color projector equipped with a liquid crystal display element). The zoom lens of each Embodiment may be used as an image pickup optical system of an image pickup apparatus that uses an image pickup element instead of the light bulb.

The zoom lens of each Embodiment includes six lens units disposed in order from the magnification conjugate side to the reduction conjugate side, that is, the first lens unit 10 to the sixth lens unit 60, having a negative refractive power, a positive refractive power, a positive refractive power, a negative refractive power, a negative refractive power and a positive refractive power. Then, all the second lens unit 20 to the fifth lens unit 50 move to the magnification conjugate side during zooming from the wide-angle end to the telephoto end. The first lens unit 10 and the sixth lens unit 60 do not move for zooming. Because the first lens unit 10 does not move for zooming, the first lens unit 10 does not contribute to magnification-varying but enables focusing by the part thereof, namely by the second lens sub unit 12. In addition, the projector that uses the liquid crystal display element is required to have high telecentricity on the reduction conjugate side because of its incident angle characteristics. If the sixth lens unit 60 is movable while telecentricity is maintained during zooming, the light amount is decreased conspicuously at the periphery of the screen when the sixth lens unit 60 moves to the magnification conjugate side, which is undesirable.

In addition, the prism (optical member) GB is positioned on the reduction conjugate side of the sixth lens unit 60. The prism GB is a color separation/combination prism in the case of a tri-panel type projector.

The prism GB usually includes a dichroic prism for separating incident light into three colors having central wavelengths of R (wavelength 620 nm), G (wavelength 550 nm) and B (wavelength 470 nm). Further, prism GB includes a dichroic prism for combining lights modulated by three different liquid crystal light bulbs.

The first lens unit 10 includes the first lens sub unit 11 and the second lens sub unit 12. The first lens sub unit 11 is fixed for focusing, and the second lens sub unit 12 is moved to the reduction conjugate side for focusing on infinity from a close distance. The first lens sub unit having a large effective diameter is fixed while only the second lens sub unit 12 formed of a single meniscus lens is moved for focusing. Thus, the first lens unit 10 can be supported by a lens barrel with high accuracy, and the weight of the lens to be moved can be reduced, with the result that eccentricity is decreased and accurate focusing can be facilitated.

For zooming, the second lens unit 20 and the third lens unit 30 are main lens units for varying magnification, which have a relatively high power (refractive power) compared with other lens units. In each Embodiment, the second lens unit 20 and the third lens unit each are formed of a single lens. If the main lens units 20 and 30 for varying magnification having a high power are formed of multiple lenses, chromatic aberration is reduced but curvature of each lens surface tends to become large. As a result, the size of the lens unit is increased so that sufficient stroke (movement amount) cannot be obtained, or the transmittance tends to become small conspicuously compared with a single lens, which is undesirable.

Even if the lens unit for varying magnification having a relatively short focal length and a small magnification-varying ratio is formed of a single lens, it is easy to reduce variations of various aberrations to relatively small values. On the contrary, the lens unit having a long focal length and a large magnification-varying ratio tends to have a larger beam height in the lens unit and a larger variation thereof. Therefore, the variation of the axial chromatic aberration increases, in particular.

In each Embodiment, movement amounts of the second, third and fourth lens units 20, 30 and 40 for zooming from the wide-angle end to the telephoto end are denoted by D2, D3 and D4, respectively. The lens length (distance between the lens front end surface and the lens rear end surface) is denoted by L. In this case, the following conditional expressions are satisfied.

$$0.8 < D3/D4 < 1.2 \tag{1}$$

$$1.2 < D3/D2 < 2.0 \tag{2}$$

$$0.2 < D4/L < 0.4 \tag{3}$$

The zoom lens according to each Embodiment satisfies the conditional expressions (1) to (3), to thereby realize that the variation of axial chromatic aberration is decreased during zooming even if the second lens unit 20 and the third lens unit 30 are each formed of a single lens.

The conditional expression (1) indicates that a ratio of the movement amounts of the third lens unit 30 and the fourth lens unit 40 during zooming is close to 1.0. The conditional expression (2) indicates that the movement amount of the third lens unit 30 during zooming is larger than that of the second lens unit 20. The conditional expression (3) indicates that the movement amount of the fourth lens unit 40 during zooming is relatively large.

An optical path of an axial beam that passes through the zoom lens is described. In a negative lead type zoom lens in which the first lens unit 10 is formed of lens units each having a negative refractive power, the height of the beam is made higher by the first lens unit 10. Therefore, in the second lens unit 20, the incident height (hereinafter denoted by h) of the axial beam is always larger than that of the first lens unit 10. Therefore, when the second lens unit 20 moves to the magnification conjugate side during zooming from the wide-angle end to the telephoto end, the incident height h of the axial beam changes largely. The third-order coefficient of the axial chromatic aberration is proportional to the square of the incident height h. Therefore, in order to reduce the variation of the axial chromatic aberration, it is necessary to reduce the variation of the incident height h at the second lens unit 20. On the other hand, there is a feature that the incident height h is always the same for varying magnification at the aperture stop STO. Therefore, if the lens unit in which the incident height h should not be changed is resistant to move relatively to the aperture stop STO, the variation of the incident height h can be reduced.

If the aperture stop STO is included in the third lens unit 30, the variation of the incident height h can be reduced at the third lens unit 30. Further, by setting the ratio between the movement amounts of the third lens unit 30 and the fourth lens unit 40 for zooming to be close to 1.0 as shown in the conditional expression (1), the variation of the incident height h to the fourth lens unit 40 can be reduced.

On the other hand, in order to obtain high magnification-varying ratio, it is necessary to increase the movement amounts of the second lens unit 20. However, in order to keep the variation of the incident height h to be minimum, the movement amount of the third lens unit 30 is set larger than the movement amount of the second lens unit 20 as shown in the conditional expression (2). As a result of reducing the ratio of the movement amounts between the third lens unit 30 and the fourth lens unit 40 for zooming, the fourth lens unit 40 moves largely for zooming as shown in the conditional expression (3).

When the conditions described above are satisfied, an upper axial beam and a lower axial beam between the second lens unit 20 and the third lens unit 30 (that are beams emitted from one point on the optical axis and passing through the outermost part of the beam restricted by the F-number (marginal light beams)) become more parallel to the optical axis than normal. In other words, an optical arrangement can be realized in which the variation of the incident height h can be reduced even if the interval between the second lens unit 20 and the third lens unit 30 is changed.

In the case where the conditional expression (1) is not satisfied, the variation of the incident height h at the fourth lens unit 40 tends to become large to increase the variation of the axial chromatic aberration, which is undesirable. In the case where the upper limit of the conditional expression (2) is not satisfied, the movement amount of the second lens unit 20 with respect to the lens length is decreased to weaken the magnification-varying effect, which is undesirable. In addition, in the case where the lower limit of the conditional expression (2) is not satisfied, the variation of the incident height h at the second lens unit 20 increases, which is undesirable. In the case where the upper limit of the conditional expression (3) is not satisfied, the aperture stop STO moves excessively, to thereby make difficult to correct off-axis aberration or decrease extremely the marginal beam amount, which is undesirable. In the case where the lower limit of the conditional expression (3) is not satisfied, the variation of the incident height h in the second lens unit 20 is increased or the magnification-varying effect is weakened, which is undesirable.

It is more preferred to set the value ranges of the conditional expressions (1) to (3) as follows.

$$1.0 < D3/D4 < 1.1 \quad (1a)$$

$$1.25 < D3/D2 < 1.80 \quad (2a)$$

$$0.25 < D4/L < 0.35 \quad (3a)$$

AS described above, according to each Embodiment, the chromatic aberration can be corrected appropriately over the entire screen, and hence a zoom lens having high optical performance can be obtained.

In the zoom lens of each Embodiment, it is more preferred that one or more of the following conditions be satisfied.

The focal lengths of the first lens unit 10, the second lens unit 20 and the sixth lens unit 60 are denoted by f1, f2 and f6. The principal point interval between the first lens unit 10 and the second lens unit 20 at the wide-angle end and at the telephoto end are denoted by $H_{12W}$ and $H_{12T}$, respectively.

The imaging magnifications of the second lens unit 20 and the third lens unit 30 at the telephoto end are denoted by $\beta_{2T}$ and $\beta_{3T}$, respectively.

The partial dispersion ratio of the material of the positive lens of the second lens unit 20 is denoted by θgF(B2). The partial dispersion ratio and the extraordinary dispersion of the positive lens of the third lens unit 30 are denoted by θgF(B3) and ΔθgF(B3), respectively.

Here, the Abbe number (Abbe number with respect to the d-line) Vd, the partial dispersion ratio θgF for the g- and F-lines, and the extraordinary dispersion ΔθgF are as follows. The refractive indices of the material with respect to the g-line (wavelength 435.8 nm), the F-line (486.1 nm), the d-line (587.6 nm), and the C-line (656.3 nm) are denoted by Ng, Nd, Nf, and Nc, respectively. In this case, the following equations are satisfied.

partial dispersion ratio θgF=(Ng−Nf)/(Nf−Nc)

extraordinary dispersion ΔθgF=θgF−(0.6438−0.001682×Vd)

Vd=(Nd−1)/(Nf−Nc)

The refractive power and the Abbe number of the material of the a-th lens from the magnification conjugate side among the lenses constituting the first lens unit 10 are denoted by φ1a and Vd1a, respectively. Assuming that the combination of the third lens unit 30 and the fourth lens unit 40 be a single lens unit, the refractive power and the Abbe number of the material of the a-th lens from the magnification conjugate side are denoted by φ34a and Vd34a, respectively.

The movement amount of the fifth lens unit 50 in zooming from the wide-angle end to the telephoto end is denoted by D5.

In this case, it is good to satisfy one or more of the following conditional expressions.

$$1.0 < (|f1|+H_{12W})/f2 < 1.5 \quad (4)$$

$$0.8 < (|f1|+H_{12T})/f2 < 1.2 \quad (5)$$

$$1.3 < \beta_1 \times \beta_{3T} < -0.7 \quad (6)$$

$$0.520 < \theta gF(B2) < 0.550 \quad (7)$$

$$0.590 < \theta gF(B3) < 0.670 \quad (8)$$

$$0.007 < \Delta\theta gF(B3) < 0.030 \quad (9)$$

$$|\Sigma(\phi 1a/Vd1a)|/|\Sigma\phi 1a| < 0.015 \quad (10)$$

$$|\Sigma(\phi 34a/Vd34a)|/|\Sigma\phi 34a| < 0.026 \quad (11)$$

$$0.8 < D2/D5 < 1.2 \quad (12)$$

$$1.2 < D4/D5 < 2.0 \quad (13)$$

$$1.0 < |f6/f1| < 2.0 \quad (14)$$

In order to reduce the axial chromatic aberration, each of the lens units on the magnification conjugate side of the lens unit for varying magnification needs to be configured achromatic sufficiently. The conditional expressions (4) and (5) show the conditions therefor.

The conditional expression (4) and the conditional expression (5) show the conditions for the upper axial beam and the lower axial beam between the second lens unit 20 and the third lens unit 30 when close to parallel to the optical axis.

When the conditions are satisfied, it is easy to reduce the variation of the incident height h of the axial beam even if the interval between the lens units is changed.

The conditional expression (5) shows the condition for the upper axial beam and the lower axial beam between the second lens unit 20 and the third lens unit 30 to be parallel to the optical axis at the telephoto end where the incident height h becomes large. When the value of the conditional expression (5) is 1.0, the complete parallel state is obtained. The conditional expression (4) defines the degree of parallelization at the wide-angle end. Because the interval between the second lens unit 20 and the third lens unit 30 is decreased for varying magnification, the variation of the incident height h at the third lens unit 30 can be reduced by configuring the beam converging toward the reduction conjugate side at the wide-angle end.

In the case where the upper limit of the conditional expression (4) is not satisfied, the inclinations of the upper axial beam and the lower axial beam with respect to the optical axis tend to become large at the wide-angle end, which is undesirable. In the case where the lower limit of the conditional expression (4) is not satisfied, the inclinations of the upper axial beam and the lower axial beam with respect to the optical axis tend to become large at the telephoto end, which is undesirable. In the case where the upper limit of the conditional expression (5) is not satisfied, the inclinations of the upper axial beam and the lower axial beam with respect to the optical axis tend to become large at the wide-angle end, which is undesirable. In the case where the lower limit of the conditional expression (5) is not satisfied, the inclinations of the upper axial beam and the lower axial beam with respect to the optical axis tend to become large at the telephoto end, which is undesirable.

The conditional expression (6) shows the condition for reducing the variation of the axial chromatic aberration also mainly even in high magnification-varying. The conditional expression (6) shows the combined imaging magnification of the second lens unit 20 and the third lens unit 30 which are the main lens units for varying magnification. By keeping the value of the conditional expression (6) to be small, it is easy to prevent the longitudinal aberration remaining in the first lens unit 10 from increasing undesirably. In order to obtain a high zoom ratio, the value of the conditional expression (6) is set to be close to −1. Then, it is easy to obtain a high zoom ratio and to minimize the variation of the axial chromatic aberration. In the case where the upper limit of the conditional expression (6) is not satisfied, the longitudinal aberration remaining in the first lens unit 10 tends to become large. As a result, the axial chromatic aberration and the variation thereof increase, and it is difficult to correct the increase by the fourth lens unit 40 and subsequent lens units. In the case where the lower limit of the conditional expression (6) is not satisfied, it is difficult to obtain a necessary zoom ratio, which is undesirable.

The conditional expressions (7) to (9) show the conditions for reducing the absolute value of the axial chromatic aberration and the variation thereof. If the second lens unit 20 and the fourth lens unit 40 move for zooming when reducing the variation of the incident height h of the axial beam to the lens units, it is difficult to reduce the variation of the incident height h to zero. The conditional expressions (7) to (9) show the conditions for reducing the axial chromatic aberration by appropriately selecting a material of the lens constituting the second lens unit 20 and by appropriately selecting a material of the lens constituting the third lens unit 30.

In each Embodiment, comparing the second lens unit 20 with the third lens unit 30, the variation of the incident height h at the second lens unit 20 is a little larger. Therefore, it is preferred to use a material having a small color dispersion for the second lens unit 20. In particular, by using a material having a low partial dispersion ratio, it is easy to improve the axial chromatic aberration.

Here, in usual chromatic aberration correction, the chromatic aberration at extremely-short wavelength and extremely-long wavelength is likely to be overcorrected a little. If attempting to balance the correction of the chromatic aberration, an state of out of focus is likely to be obtained in which the focus is shifted to the over side, that is a so-called bowl-shaped axial chromatic aberration. Therefore, a material having a small dispersion, particularly a material having a low partial dispersion ratio is used for the lens of the third lens unit 30 in which the variation of the incident height h is small, so that further reduction of the axial chromatic aberration can be facilitated. Further, it is effective to use a material having extraordinary dispersion for the lens constituting the third lens unit 30.

In the case where any of the upper limit of the conditional expression (7), the upper limit of the conditional expression (8) and the upper limit of the conditional expression (9) is not satisfied, a material having stable characteristics cannot be obtained, which is undesirable. In the case where the lower limit of the conditional expression (7) is not satisfied, the variation of the axial chromatic aberration in the second lens unit tends to become large, which is undesirable. In the case where the lower limit of the conditional expression (8) is not satisfied, higher correction effect of the axial chromatic aberration should be achieved by the other lens units, which is undesirable. In the case where the lower limit of the conditional expression (9) is not satisfied, the axial chromatic aberration increases at short wavelength and long wavelength, which is undesirable.

The conditional expression (10) approximately expresses an occurrence of the axial chromatic aberration in the first lens unit 10 by eliminating the incident height h of the beams, in which the smaller the value of the expression (10) is the more preferable it is because the remaining axial chromatic aberration in the first lens unit 10 is smaller. The conditional expression (11) shows that the sum of the axial chromatic aberration values in the third lens unit 30 and in the fourth lens unit 40 is in a constant range or smaller, which indicates an achromatic relationship in the third lens unit 30 and in the fourth lens unit 40.

In addition to the conditional expressions (1) and (2), it is preferred to satisfy the conditional expressions (12) and (13). According to this, the third lens unit 30 and the fourth lens unit 40 move along the respective loci which have a near-translation relationship between the loci which have a near-translation relationship along which the second lens unit 20 and the fifth lens unit 50 move, so as to perform image point correction and axial chromatic aberration adjustment. Thus, it is easy to reduce the variation of the axial chromatic aberration.

The conditional expression (14) shows a ratio of power (refractive power) between the fixed sixth lens unit 60 and the fixed first lens unit 10. In the range of the conditional expression (14), it is easy to prevent the lens length from being increased undesirably. In the case where the upper limit of the conditional expression (14) is not satisfied, it is difficult to maintain the long back focus. In the case where the lower limit of the conditional expression (14) is not satisfied, it is easy to correct the aberration but the lens length increases, which is undesirable.

As a preferred aspect for correcting the axial chromatic aberration in the zoom lens of the present invention, there is a structure in which the following conditional expressions are satisfied in the zoom lens having the above-mentioned six unit structure.

(a) The conditional expressions (2), (7) and (8) are satisfied. More preferably, the conditional expression (9) is also satisfied.

(b) The conditional expressions (1), (2) and (7) to (9) are satisfied. More preferably, the conditional expression (11) is also satisfied.

(c) The conditional expressions (2) and (7) to (9) are satisfied. More preferably, the conditional expressions (1), (10) and (11) are also satisfied.

More preferably, it is better to set the numerical ranges of the conditional expressions (4) to (7) as follows.

$$1.10 < (|f1| + H_{12W})/f2 < 1.47 \quad (4a)$$

$$0.83 < (|f1| + H_{12T})/f2 < 1.15 \quad (5a)$$

$$1.10 < \beta_{2T} \times \beta_{3T} < -0.73 \quad (6a)$$

$$0.525 < \theta gF(B2) < 0.546 \quad (7a)$$

$$0.600 < \theta gF(B3) < 0.650 \quad (8a)$$

$$0.010 < \Delta\theta gF(B3) < 0.020 \quad (9a)$$

$$|\Sigma(\phi 1a/Vd1a)|/|\Sigma\phi 1a| < 0.014 \quad (10a)$$

$$|\Sigma(\phi 34a/Vd34a)|/|\Sigma\phi 34a| < 0.0255 \quad (11a)$$

$$0.9 < D2/D5 < 1.1 \quad (12a)$$

$$1.3 < D4/D5 < 1.9 \quad (13a)$$

$$1.1 < |f6/f1| < 1.5 \quad (14a)$$

As described above, according to each Embodiment, the axial chromatic aberration due to zooming can be appropriately corrected by the simple unit structure, so that the zoom lens having a long focal length and good optical performance over the entire zoom range can be obtained.

In each Embodiment, a so-called inner focus is adopted for focusing, but the entire first lens unit 10 may be moved, or a so-called floating may be utilized in which the first lens sub unit 11 is also moved for focusing by an amount different from that of the second lens unit 12. Hereinafter, features of individual Numerical Embodiments are described.

Numerical Embodiment 1

In Numerical Embodiment 1, the variation of the axial chromatic aberration in zooming is reduced. Mainly, three wavelengths of R (620 nm), G (550 nm) and B (470 nm) are assumed, and targets of the variation of the axial chromatic aberration thereof are set as R−G=10 μm and B−G=30 μm. Here, the focal depth range for obtaining an appropriate resolution at a spatial frequency of 64/mm when the F-number Fno at the wide angle end is 2.0 is ±22 μm. The zoom lens of Embodiment 1 of the present invention illustrated in FIG. 1 is formed of total 15 lens elements from the first lens unit 10 to the sixth lens unit 60. Table 1(D) shows values of the graph illustrated in FIG. 2. In Numerical Embodiment 1, the difference of the axial chromatic aberration from the target is 10.4 μm at a maximum at R (620 μm) and 18.9 μm at a maximum at B (470 μm). Therefore, the axial chromatic aberration is optimized in a substantially appropriate range.

Numerical Embodiment 2

In Numerical Embodiment 2, the variation of the axial chromatic aberration in zooming is reduced as compared to Numerical Embodiment 1. Mainly, three wavelengths of R (620 nm), G (550 nm) and B (470 nm) are assumed, and targets of the variation of the axial chromatic aberration thereof are set as R−G=10 μm and B−G=30 μm. Table 2(D) shows values corresponding to FIG. 5. In Numerical Embodiment 2, the difference of the axial chromatic aberration from the target is 8.7 μm at a maximum at R (620 μm) and 12.5 μm at a maximum at B (470 μm). Therefore, the axial chromatic aberration is optimized in a substantially appropriate range.

Numerical Embodiment 3

When the tri-panel type projector is assumed, it is possible to fix the light bulb corresponding to each color to an optimal position in the optical axis direction for each color. If the variation of the axial chromatic aberration with respect to the wavelength is steep, the optimal position of the light bulb is different for each wavelength. Therefore, even if the projected image is focused for a certain wavelength, a focus position for a close wavelength has a large deviation, with the result that the image is a little blurred. In Numerical Embodiment 3, focus deviation sensitivity with respect to the wavelength is appropriately set in short wavelength. Targets of the variation of the axial chromatic aberration for three wavelengths R (620 nm), G (550 nm) and B (470 nm) are set as R−G=3 μm and B−G=15 μm. In Numerical Embodiment 3, the material of the positive lens of the second lens unit is a low dispersion material, so that relatively flat axial chromatic aberration with respect to the wavelength is obtained in short wavelength, and the blur in short wavelength side is reduced. Table 3(D) shows values corresponding to FIG. 8. In Numerical Embodiment 3, the difference of the axial chromatic aberration from the target is 3.6 μm at a maximum at R (620 μm) and 6.7 μm at a maximum at B (470 μm). Therefore, the axial chromatic aberration is optimized in a preferably appropriate range.

Numerical Embodiment 4

In Numerical Embodiment 4, targets of the variation of the axial chromatic aberration with respect to the three wavelengths of R (620 nm), G (550 nm) and B (470 nm) are set as R−G=5 μm and B−G=30 μm. Table 4(D) shows values of the graph illustrated in FIG. 11. In Numerical Embodiment 4, the difference of the axial chromatic aberration from the target is 7.4 μm at a maximum at R (620 μm) and 11.4 μm at a maximum at B (470 μm). Therefore, the axial chromatic aberration is optimized in a substantially appropriate range.

Numerical Embodiment 5

In Numerical Embodiment 5, targets of the variation of the axial chromatic aberration with respect to the three wavelengths of R (620 nm), G (550 nm), and B (470 nm) are set as R−G=−2 μm and B−G=30 μm. Table 5(D) shows values of the graph illustrated in FIG. 14. In Numerical Embodiment 5, the difference of the axial chromatic aberration from the target is 2.2 μm at a maximum at R (620 μm) and 9.2 μm at a maximum at B (470 μm). Therefore, the axial chromatic aberration is optimized in an appropriate range.

The preferred embodiments of the present invention are described above, but the present invention are not limited to the embodiments, and various modifications and changes may be made in the scope of the spirit thereof.

Tables 1 to 5 show Numerical Embodiments of the zoom lenses of individual Embodiments. The surface numbers in Table (A) are numbers that are assigned to the lens surfaces in order from the magnification conjugate side to the reduction conjugate side. The aperture stop is denoted by STO. The curvature radius of each lens surface is denoted by r, and the interval (physical interval) between the lens surface i and the lens surface (i+1) on the optical axis is denoted by d. The intervals denoted by d1 to d5 in the Tables change according to zooming. In addition, the refractive index and the Abbe number of the material constituting each lens element with respect to the d-line are denoted by nd and vd, respectively. The surface denoted by a surface number with * on the right side has an aspherical shape expressed by the following function. Table (B) shows aspherical coefficients indicating the aspherical shape. A coordinate of the lens surface in the radial direction is denoted by y, and a coordinate in the optical axis direction is denoted by x. In addition, E−X means $10^{-X}$.

$$x = (y^2/R)/[1 + \{1 - (1+K)(y^2/R^2)\}^{1/2}] + Ay^4 + By^6 + Cy^8 + Dy^{10} + Ey^{12}$$

Table (C) shows the focal length, the F-number, the angle of field, the image height, the entire lens length, the equivalent air back focus (BF), each lens unit interval in zooming, of the zoom lens of Numerical Embodiments.

In addition, the relationships between the above-mentioned Embodiments and values are shown in Table 6.

TABLE 1

Numerical Embodiment relating to Embodiment 1

(A)

| Surface No. i | Effective Diameter | r | d 3290 | glass | nd | vd |
|---|---|---|---|---|---|---|
| 1 | 39.2 | 31.68 | 4.00 | FD60 | 1.8052 | 25.46 |
| 2 | 33.7 | 22.02 | 8.51 | | | |
| 3* | 33.2 | 118.76 | 2.50 | LBAL42 | 1.58315 | 9.38 |
| 4* | 32.1 | 37.14 | 7.99 | | | |
| 5 | 32.3 | −42.73 | 1.80 | SFSL5 | 1.4875 | 70.24 |
| 6 | 34.0 | 138.99 | 3.45 | STIH6 | 1.8052 | 25.42 |
| 7 | 34.4 | −171.36 | 2.78 | | | |
| 8 | 35.0 | −174.68 | 3.00 | SLAL18 | 1.7292 | 54.68 |
| 9 | 35.3 | −67.23 | d1 | | | |
| 10 | 37.4 | 55.15 | 4.35 | SLAL18 | 1.7292 | 54.68 |
| 11 | 36.9 | 207.97 | d2 | | | |
| 12 | 31.9 | 53.26 | 3.30 | STIH6 | 1.8052 | 25.42 |
| 13 | 31.3 | 225.33 | 5.00 | | | |
| STO | 28.4 | ∞ | d3 | | | |
| 15 | 26.1 | −437.40 | 1.50 | STIM35 | 1.6989 | 30.13 |
| 16 | 24.9 | 26.60 | 5.80 | SBSL7 | 1.5163 | 64.14 |
| 17 | 24.6 | −122.85 | d4 | | | |
| 18 | 23.3 | 36.91 | 6.25 | SBSL7 | 1.5163 | 64.14 |
| 19 | 22.3 | −57.78 | 2.30 | EFD5 | 1.6727 | 32.17 |
| 20 | 21.7 | 29.73 | 6.78 | | | |
| 21 | 22.3 | −20.40 | 1.35 | SNBH8 | 1.7205 | 34.71 |
| 22 | 26.4 | 113.12 | 8.10 | SFSL5 | 1.4875 | 70.24 |
| 23 | 29.5 | −26.40 | 0.50 | | | |
| 24 | 35.2 | 152.66 | 8.05 | SFPL51 | 1.4970 | 81.54 |
| 25 | 36.4 | −37.56 | d5 | | | |
| 26 | 39.9 | 76.96 | 4.60 | SNPH1 | 1.8081 | 22.76 |
| 27 | 39.7 | −484.37 | 1.50 | | | |
| 28 | 40.0 | ∞ | 39.24 | SBSL7 | 1.5163 | 64.14 |
| 29 | 40.0 | ∞ | 19.50 | SF6 | 1.8052 | 25.43 |
| Image plane | 40.0 | ∞ | | | | |

(B) Aspherical Coefficient

| | s3 | s4 |
|---|---|---|
| R | 118.763 | 37.141 |
| κ | 0 | 0 |
| A (Fourth order) | −3.889E−06 | −9.881E−06 |
| B (Sixth order) | −6.121E−09 | −1.496E−08 |
| C (Eighth order) | 5.727E−11 | 7.921E−11 |
| D (Tenth order) | −2.192E−13 | −3.388E−13 |
| E (Twelfth order) | 2.080E−16 | 3.649E−16 |

(C) Paraxial amount

| | WIDE | MIDDLE | TELE |
|---|---|---|---|
| Focal length | 33.96 | 45.87 | 57.87 |
| F-number | 2.00 | 2.42 | 2.84 |
| Angle of field | 42.1 | 31.8 | 25.6 |
| Image height | 13.1 | 13.1 | 13.1 |
| Total lens length | 204.17 | 204.16 | 204.17 |
| BF (in air) | 45.74 | 45.73 | 45.74 |
| d1 | 32.87 | 13.46 | 3.56 |
| d2 | 25.88 | 18.76 | 5.60 |
| d3 | 5.13 | 7.93 | 7.71 |
| d4 | 1.61 | 7.12 | 19.05 |
| d5 | 1.02 | 19.25 | 30.59 |

Total length: distance from the lens front end surface to the lens rear end surface plus BF BF: equivalent air distance from the lens rear end surface to the paraxial image plane

TABLE 1-continued (D) Axial chromatic aberration in Numerical Embodiment 1

| WL (nm) | WIDE | MIDDLE | TELE |
|---|---|---|---|
| 450 | 34.6 | 59.2 | 17.6 |
| 470 | 20.9 | 40.9 | 11.1 |
| 550 | 0.0 | 0.0 | 0.0 |
| 620 | 11.7 | −0.4 | 16.8 |

TABLE 2

Numerical Embodiment relating to Embodiment 2

(A)

| Surface No. i | Effective Diameter | r | d 3290 | glass | nd | vd |
|---|---|---|---|---|---|---|
| 1 | 42.3 | 32.54 | 6.39 | STIH6 | 1.8118 | 25.42 |
| 2 | 34.4 | 22.05 | 9.40 | | | |
| 3* | 33.7 | 116.41 | 2.50 | LBAL42 | 1.5852 | 59.38 |
| 4* | 33.1 | 37.13 | 8.51 | | | |
| 5 | 33.2 | −38.69 | 1.80 | SFSL5 | 1.4890 | 70.24 |
| 6 | 35.2 | 313.77 | 3.21 | STIH6 | 1.8118 | 25.42 |
| 7 | 35.5 | −117.02 | 2.85 | | | |
| 8 | 36.2 | −177.81 | 2.95 | SLAL18 | 1.7320 | 54.68 |
| 9 | 36.5 | −69.71 | d1 | | | |
| 10 | 39.2 | 57.53 | 4.29 | SLAL18 | 1.7320 | 54.68 |
| 11 | 38.9 | 463.14 | d2 | | | |
| 12 | 31.2 | 57.09 | 2.96 | STIH6 | 1.8118 | 25.42 |
| 13 | 30.6 | 204.17 | 5.00 | | | |
| STO | 27.7 | 0.00 | d3 | | | |
| 15 | 25.1 | −256.48 | 1.50 | STIM35 | 1.7038 | 30.13 |
| 16 | 24.2 | 28.62 | 5.44 | SBSL7 | 1.5181 | 64.14 |
| 17 | 23.9 | −101.39 | d4 | | | |
| 18 | 23.3 | 36.89 | 4.21 | SBSL7 | 1.5181 | 64.14 |
| 19 | 23.0 | −62.85 | 2.30 | STIM25 | 1.6771 | 32.10 |
| 20 | 22.1 | 30.19 | 6.54 | | | |
| 21 | 22.4 | −20.77 | 1.35 | SNBH8 | 1.7249 | 34.71 |
| 22 | 26.7 | 90.07 | 8.56 | SFSL5 | 1.4890 | 70.24 |
| 23 | 29.7 | −27.08 | d5 | | | |
| 24 | 34.7 | 144.18 | 7.99 | SFPL51 | 1.4983 | 81.54 |
| 25 | 35.8 | −38.45 | 1.00 | | | |
| 26 | 39.6 | 82.04 | 4.55 | SNPH1 | 1.8155 | 22.76 |
| 27 | 39.3 | −306.37 | 1.51 | | | |
| 28 | 40.0 | ∞ | 31.74 | SBSL7 | 1.5181 | 64.14 |
| 29 | 40.0 | ∞ | 7.50 | SBSL7 | 1.5181 | 64.14 |
| 30 | 40.0 | ∞ | 19.50 | SF6 | 1.8119 | 25.43 |
| Image plane | 40.0 | ∞ | | | | |

(B) Aspherical Coefficient

| | s3 | s4 |
|---|---|---|
| R | 116.409 | 37.132 |
| κ | 0 | 0 |
| A (Fourth order) | −4.535E−06 | −1.084E−05 |
| B (Sixth order) | 4.840E−09 | −1.282E−09 |
| C (Eighth order) | −4.557E−13 | 1.422E−12 |
| D (Tenth order) | −4.466E−14 | −8.458E−14 |
| E (Twelfth order) | 1.632E−17 | 5.324E−17 |

(C) Paraxial amount

| | WIDE | MIDDLE | TELE |
|---|---|---|---|
| Focal length | 34.00 | 46.29 | 57.98 |
| F-number | 1.97 | 2.42 | 2.85 |
| Angle of field | 42.1 | 31.6 | 25.5 |
| Image height | 13.1 | 13.1 | 13.1 |
| Total lens length | 204.25 | 204.25 | 204.25 |
| BF (in air) | 45.76 | 45.76 | 45.76 |
| d1 | 33.92 | 13.86 | 3.62 |
| d2 | 25.88 | 18.76 | 5.60 |

TABLE 2-continued

| | | | |
|---|---|---|---|
| d3 | 5.90 | 9.51 | 9.85 |
| d4 | 1.50 | 6.98 | 18.49 |
| d5 | 1.02 | 19.25 | 30.59 |

Total length: distance from the lens front end surface to the lens rear end surface plus BF
BF: equivalent air distance from the lens rear end surface to the paraxial image plane (D) Axial chromatic aberration in Numerical Embodiment 2

| WL (nm) | WIDE | MIDDLE | TELE |
|---|---|---|---|
| 450 | 51.1 | 64.0 | 38.2 |
| 470 | 31.3 | 42.5 | 24.4 |
| 550 | 0.0 | 0.0 | 0.0 |
| 620 | 8.6 | 1.3 | 13.8 |

TABLE 3

Numerical Embodiment relating to Embodiment 3

(A)

| Surface No. i | Effective Diameter | r | d 3290 | glass | nd | νd |
|---|---|---|---|---|---|---|
| 1 | 42.3 | 32.17 | 7.00 | STIH6 | 1.8118 | 25.42 |
| 2 | 34.0 | 21.78 | 8.64 | | | |
| 3* | 33.4 | 110.05 | 2.50 | LBAL42 | 1.5852 | 59.38 |
| 4* | 32.5 | 36.17 | 8.88 | | | |
| 5 | 32.5 | −35.74 | 1.80 | SFSL5 | 1.4890 | 70.24 |
| 6 | 34.6 | 2311.56 | 3.39 | STIH6 | 1.8118 | 25.42 |
| 7 | 35.0 | −84.96 | 3.02 | | | |
| 8 | 35.9 | −192.83 | 2.86 | SLAL18 | 1.7320 | 54.68 |
| 9 | 36.2 | −74.43 | d1 | | | |
| 10 | 36.6 | 53.94 | 4.45 | SFPL51 | 1.4983 | 81.54 |
| 11 | 36.4 | 675.65 | d2 | | | |
| 12 | 32.9 | 52.32 | 3.66 | STIH6 | 1.8118 | 25.42 |
| 13 | 32.3 | 339.26 | 5.00 | | | |
| STO | 28.9 | ∞ | d3 | | | |
| 15 | 26.4 | −2377.11 | 1.50 | STIM35 | 1.7038 | 30.13 |
| 16 | 25.1 | 25.85 | 5.66 | SBSL7 | 1.5181 | 64.14 |
| 17 | 24.7 | −242.66308 | d4 | | | |
| 18 | 23.5 | 39.61 | 7.47 | SBSL7 | 1.5181 | 64.14 |
| 19 | 21.4 | −73.31 | 1.00 | STIM25 | 1.6771 | 32.10 |
| 20 | 20.2 | 30.82 | 6.65 | | | |
| 21 | 21.3 | −21.62 | 1.35 | SNBH8 | 1.7249 | 34.71 |
| 22 | 25.3 | 86.31 | 8.35 | SFSL5 | 1.4890 | 70.24 |
| 23 | 28.7 | −27.32 | 0.50 | | | |
| 24 | 33.8 | 125.75 | 7.61 | SFPL51 | 1.4983 | 81.54 |
| 25 | 35.0 | −40.94 | d5 | | | |
| 26 | 40.5 | 81.05 | 4.56 | SNPH1 | 1.8155 | 22.76 |
| 27 | 40.3 | −408.82 | 1.50 | | | |
| 29 | 40.0 | ∞ | 7.50 | SBSL7 | 1.5163 | 64.14 |
| 30 | 40.0 | ∞ | 19.50 | SF6 | 1.8052 | 25.43 |
| Image plane | 40.0 | ∞ | | | | |

(B) Aspherical Coefficient

| | s3 | s4 |
|---|---|---|
| R | 110.053 | 36.171 |
| κ | 0 | 0 |
| A (Fourth order) | −4.549E−06 | −1.110E−05 |
| B (Sixth order) | 6.345E−09 | −1.642E−09 |
| C (Eighth order) | −6.794E−12 | 6.919E−12 |
| D (Tenth order) | −3.129E−14 | −1.195E−13 |
| E (Twelfth order) | −5.614E−18 | 9.148E−17 |

(C) Paraxial amount

| | WIDE | MIDDLE | TELE |
|---|---|---|---|
| Focal length | 34.01 | 47.98 | 61.37 |
| F-number | 2.02 | 2.47 | 2.89 |
| Angle of field | 42.0 | 30.5 | 24.2 |

TABLE 3-continued

| | | | |
|---|---|---|---|
| Image height | 13.1 | 13.1 | 13.1 |
| Total lens length | 209.22 | 209.21 | 209.21 |
| BF (in air) | 45.72 | 45.71 | 45.71 |
| d1 | 37.85 | 13.91 | 3.70 |
| d2 | 22.24 | 17.80 | 3.72 |
| d3 | 5.06 | 8.19 | 7.61 |
| d4 | 1.50 | 5.08 | 15.87 |
| d5 | 1.00 | 22.68 | 36.75 |

Total length: distance from the lens front end surface to the lens rear end surface plus BF
BF: equivalent air distance from the lens rear end surface to the paraxial image plane (D) Axial chromatic aberration in Numerical Embodiment 3

| WL (nm) | WIDE | MIDDLE | TELE |
|---|---|---|---|
| 450 | 27.6 | 26.6 | 8.3 |
| 470 | 18.2 | 21.7 | 9.3 |
| 550 | 0.0 | 0.0 | 0.0 |
| 620 | 6.6 | 0.6 | 6.6 |

TABLE 4

Numerical Embodiment relating to Embodiment 4

(A)

| Surface No. i | Effective Diameter | r | d 3290 | glass | nd | νd |
|---|---|---|---|---|---|---|
| 1 | 41.9 | 31.76 | 7.00 | STIH6 | 1.8052 | 25.42 |
| 2 | 33.5 | 21.50 | 8.89 | | | |
| 3* | 32.9 | 111.35 | 2.50 | LBAL42 | 1.5831 | 59.38 |
| 4* | 31.7 | 35.27 | 8.75 | | | |
| 5 | 31.7 | −35.12 | 1.80 | SFSL5 | 1.4875 | 70.24 |
| 6 | 33.8 | 936.16 | 3.31 | STIH6 | 1.8052 | 25.42 |
| 7 | 34.3 | −89.45 | 3.02 | | | |
| 8 | 35.4 | −225.94 | 2.95 | SLAL18 | 1.7292 | 54.68 |
| 9 | 35.7 | −74.01 | d1 | | | |
| 10 | 37.4 | 50.30 | 5.19 | SFSL5 | 1.4875 | 70.24 |
| 11 | 37.0 | −1793.52 | d2 | | | |
| 12 | 31.9 | 52.82 | 3.13 | STIH53 | 1.8467 | 23.78 |
| 13 | 31.3 | 166.60 | 5.00 | | | |
| STO | 28.3 | 0.00 | d3 | | | |
| 15 | 25.6 | 8307.24 | 1.50 | STIM35 | 1.6989 | 30.13 |
| 16 | 24.6 | 26.14 | 5.45 | SBSL7 | 1.5163 | 64.14 |
| 17 | 24.5 | −175.54 | d4 | | | |
| 18 | 23.7 | 36.23 | 4.91 | SBSL7 | 1.5163 | 64.14 |
| 19 | 23.3 | −66.13 | 2.30 | STIM25 | 1.6727 | 32.10 |
| 20 | 22.3 | 29.41 | 6.99 | | | |
| 21 | 22.8 | −20.50 | 1.35 | SNBH8 | 1.7205 | 34.71 |
| 22 | 27.1 | 88.73 | 8.33 | SFSL5 | 1.4875 | 70.24 |
| 23 | 29.7 | −26.51 | 0.50 | | | |
| 24 | 35.4 | 136.75 | 8.06 | SFPL51 | 1.4970 | 81.54 |
| 25 | 36.6 | −38.52 | d5 | | | |
| 26 | 40.2 | 82.52 | 4.57 | SNPH1 | 1.8081 | 22.76 |
| 27 | 40.0 | −328.51 | 1.50 | | | |
| 28 | 40.0 | ∞ | 31.74 | SBSL7 | 1.5163 | 64.14 |
| 29 | 40.0 | ∞ | 7.50 | SBSL7 | 1.5163 | 64.14 |
| 30 | 40.0 | ∞ | 19.50 | SF6 | 1.8052 | 25.43 |
| Image plane | 40.0 | ∞ | | | | |

(B) Aspherical Coefficient

| | s3 | s4 |
|---|---|---|
| R | 111.352 | 35.273 |
| κ | 0 | 0 |
| A (Fourth order) | −3.983E−06 | −1.086E−05 |
| B (Sixth order) | 6.051E−09 | −9.850E−10 |
| C (Eighth order) | −3.078E−12 | 5.575E−13 |
| D (Tenth order) | −4.763E−14 | −1.046E−13 |
| E (Twelfth order) | 2.063E−17 | 7.120E−17 |

TABLE 4-continued (C) Paraxial amount

|  | WIDE | MIDDLE | TELE |
| --- | --- | --- | --- |
| Focal length | 34.01 | 46.28 | 57.95 |
| F-number | 1.99 | 2.41 | 2.81 |
| Angle of field | 42.0 | 31.6 | 25.6 |
| Image height | 13.1 | 13.1 | 13.1 |
| Total lens length | 204.25 | 204.24 | 204.25 |
| BF (in air) | 45.75 | 45.74 | 45.75 |
| d1 | 34.44 | 13.83 | 3.61 |
| d2 | 20.34 | 14.56 | 2.50 |
| d3 | 5.72 | 8.35 | 7.55 |
| d4 | 1.50 | 6.59 | 18.37 |
| d5 | 1.00 | 19.67 | 30.97 |

Total length: distance from the lens front end surface to the lens rear end surface plus BF
BF: equivalent air distance from the lens rear end surface to the paraxial image plane (D) Axial chromatic aberration in Numerical Embodiment 4

| WL (nm) | WIDE | MIDDLE | TELE |
| --- | --- | --- | --- |
| 450 | 44.4 | 55.9 | 33.5 |
| 470 | 29.3 | 41.4 | 24.6 |
| 550 | 0.0 | 0.0 | 0.0 |
| 620 | 5.5 | −2.4 | 8.4 |

TABLE 5

Numerical Embodiment relating to Embodiment 5

(A)

| Surface No. i | Effective Diameter | r | d 3290 | glass | nd | vd |
| --- | --- | --- | --- | --- | --- | --- |
| 1 | 42.9 | 33.11 | 6.43 | STIH6 | 1.80522 | 5.42 |
| 2 | 34.9 | 22.43 | 8.14 |  |  |  |
| 3* | 34.7 | 82.38 | 2.50 | LBAL42 | 1.5831 | 59.38 |
| 4* | 33.8 | 33.63 | 9.58 |  |  |  |
| 5 | 33.9 | −37.65 | 1.80 | SFSL5 | 1.4875 | 70.24 |
| 6 | 36.1 | 333.65 | 4.12 | STIH6 | 1.8052 | 25.42 |
| 7 | 36.6 | −92.09 | 3.12 |  |  |  |
| 8 | 37.4 | −1001.22 | 2.84 | SLAL18 | 1.7292 | 54.68 |
| 9 | 37.6 | −116.40 | d1 |  |  |  |
| 10 | 36.8 | 48.82 | 5.00 | SFPL51 | 1.4970 | 81.54 |
| 11 | 36.4 | 3363.81 | d2 |  |  |  |
| 12 | 31.6 | 49.92 | 3.38 | STIH6 | 1.8052 | 25.42 |
| STO | 30.9 | 182.28 | d3 |  |  |  |
| 14 | 28.8 | 130.77 | 1.50 | STIM27 | 1.6398 | 34.47 |
| 15 | 27.0 | 23.09 | 5.52 | SBSL7 | 1.5163 | 64.14 |
| 16 | 26.6 | 134.51 | d4 |  |  |  |
| 17 | 23.6 | 35.94 | 5.01 | SBSL7 | 1.5163 | 64.14 |
| 18 | 22.9 | −52.92 | 1.00 | STIM25 | 1.6727 | 32.10 |
| 19 | 21.8 | 28.27 | 6.78 |  |  |  |
| 20 | 22.1 | −21.18 | 1.35 | SNBH8 | 1.7205 | 34.71 |
| 21 | 25.5 | 77.65 | 8.18 | SFSL5 | 1.4875 | 70.24 |
| 22 | 28.3 | −27.15 | 0.50 |  |  |  |
| 23 | 32.8 | 109.01 | 7.26 | SFPL51 | 1.4970 | 81.54 |
| 24 | 33.9 | −40.36 | d5 |  |  |  |
| 25 | 37.3 | 87.05 | 4.25 | SNPH1 | 1.8081 | 22.76 |
| 26 | 37.1 | −389.82 | 1.51 |  |  |  |
| 27 | 40.0 | ∞ | 31.74 | SBSL7 | 1.5163 | 64.14 |
| 28 | 40.0 | ∞ | 7.50 | SBSL7 | 1.5163 | 64.14 |
| 29 | 40.0 | ∞ | 19.50 | SF6 | 1.8052 | 25.43 |
| Image plane | 40.0 | ∞ |  |  |  |  |

(B) Aspherical Coefficient

|  | s3 | s4 |
| --- | --- | --- |
| R | 82.381 | 33.635 |
| κ | 0 | 0 |
| A (Fourth order) | −4.036E−06 | −1.062E−05 |

TABLE 5-continued

| B (Sixth order) | 5.921E−09 | −1.151E−09 |
| --- | --- | --- |
| C (Eighth order) | −1.642E−12 | 4.503E−12 |
| D (Tenth order) | −3.397E−14 | −8.911E−14 |
| E (Twelfth order) | 2.639E−18 | 4.454E−17 |

(C) Paraxial amount

|  | WIDE | MIDDLE | TELE |
| --- | --- | --- | --- |
| Focal length | 34.00 | 47.61 | 61.29 |
| F-number | 1.990 | 2.372 | 2.846 |
| Angle of field | 42.1 | 30.8 | 24.2 |
| Image height | 13.1 | 13.1 | 13.1 |
| Total lens length | 209.218 | 209.216 | 209.214 |
| BF (in air) | 45.728 | 45.726 | 45.724 |
| d1 | 43.33 | 16.67 | 3.81 |
| d2 | 21.29 | 22.63 | 9.94 |
| d3 | 4.52 | 9.22 | 4.81 |
| d4 | 5.08 | 3.47 | 19.37 |
| d5 | 1.00 | 23.23 | 37.30 |

Total length: distance from the lens front end surface to the lens rear end surface plus BF
BF: equivalent air distance from the lens rear end surface to the paraxial image plane (D) Axial chromatic aberration in Numerical Embodiment 5

| WL (nm) | WIDE | MIDDLE | TELE |
| --- | --- | --- | --- |
| 450 | 50.1 | 26.2 | 31.5 |
| 470 | 34.5 | 20.8 | 26.7 |
| 550 | 0.0 | 0.0 | 0.0 |
| 620 | −1.5 | 0.2 | −3.9 |

TABLE 6

Value of each Conditional Expression in Embodiments

|  | Embodiment 1 | Embodiment 2 | Embodiment 3 | Embodiment 4 | Embodiment 5 |
| --- | --- | --- | --- | --- | --- |
| Conditional Expression (1) | 1.055 | 1.084 | 1.051 | 1.039 | 1.006 |
| Conditional Expression (2) | 1.692 | 1.640 | 1.542 | 1.579 | 1.287 |
| Conditional Expression (3) | 0.297 | 0.293 | 0.307 | 0.296 | 0.309 |
| Conditional Expression (4) | 1.228 | 1.410 | 1.144 | 1.297 | 1.455 |
| Conditional Expression (5) | 0.939 | 1.070 | 0.853 | 0.989 | 1.057 |
| Conditional Expression (6) | −0.966 | −0.962 | −0.865 | −0.936 | −0.787 |
| Conditional Expression (7) | 0.544 | 0.544 | 0.537 | 0.530 | 0.544 |
| Conditional Expression (8) | 0.616 | 0.616 | 0.616 | 0.621 | 0.616 |
| Conditional Expression (9) | 0.015 | 0.015 | 0.015 | 0.017 | 0.015 |
| Conditional Expression (10) | 0.012 | 0.013 | 0.012 | 0.012 | 0.010 |
| Conditional Expression (11) | −0.015 | −0.025 | −0.007 | −0.010 | 0.013 |
| Conditional Expression (12) | 0.991 | 1.028 | 0.955 | 1.029 | 1.089 |
| Conditional Expression (13) | 1.590 | 1.555 | 1.402 | 1.563 | 1.394 |
| Conditional Expression (14) | 1.249 | 1.200 | 1.181 | 1.177 | 1.195 |

Hereinafter, an embodiment in which the optical system of the present invention is applied to a projection apparatus (projector) is described with reference to FIG. 16. FIG. 16 illustrates a projection apparatus in which the zoom lens of the present invention is applied to a tri-panel type liquid crystal projector, and multiple pieces of color light image information based on multiple liquid crystal displaying elements forming original images are combined by a color combining unit so as to magnify and project the image onto a screen by the lens for projection.

In FIG. 16, a color liquid crystal projector 100 includes a prism 200 as a color combining unit for combining RGB color lights from three panels of R, G and B. Then, after being combined into one optical path, the RGB color lights are projected onto a screen 400 by using a projection lens 300 constituted by the above-mentioned zoom lens. In this way, the zoom lens of Numerical Embodiments 1 to 5 can be used for a digital camera, a projector or the like, so that a projection apparatus (optical apparatus) having high optical performance can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-131955, filed Jun. 9, 2010 and Japanese Patent Application No. 2011-105632, filed May 10, 2011 which are hereby incorporated by reference herein in their entirety.

What is claimed is:

1. A zoom lens comprising in order from a magnification conjugate side to a reduction conjugate side:
   a first lens unit having a negative refractive power, the first lens unit including a plurality of negative lenses;
   a second lens unit having a positive refractive power;
   a third lens unit having a positive refractive power; and
   a fourth lens unit,
   wherein the first lens unit do not move for zooming, while the second lens unit, the third lens unit, the fourth lens unit move to the magnification conjugate side during zooming from a wide-angle end to a telephoto end,
   wherein each of the second lens unit and the third lens unit is composed of a single positive lens, and
   wherein the following conditional expressions are satisfied:

$0.8 < D3/D4 < 1.2;$ $1.2 < D3/D2 < 2.0;$ and $0.2 < D4/L < 0.4,$ where D2, D3, and D4 represent movement amounts of the second lens unit, the third lens unit and the fourth lens unit during zooming from the wide-angle end to the telephoto end, respectively, and L represents a lens length.

2. The zoom lens according to claim 1, wherein the following conditional expressions are satisfied:

$1.0 < (|f1| + H_{12W})/f2 < 1.5;$ and $0.8 < (|f1| + H_{12T})/f2 < 1.2,$ where f1 and f2 represent focal lengths of the first lens unit and the second lens unit, respectively, and $H_{12w}$ and $H_{12t}$ represent principal point intervals between the first lens unit and the second lens unit at the wide-angle end and at the telephoto end, respectively.

3. The zoom lens according to claim 1, wherein the following conditional expression is satisfied:

$-1.3 < \beta_{2T} \times \beta_{3T} < -0.7,$ where $\beta_{2T}$ and $\beta_{3T}$ represent imaging magnifications of the second lens unit and the third lens unit at the telephoto end, respectively.

4. The zoom lens according to claim 1, wherein the following conditional expressions are satisfied:

$0.520 < \theta gF(B2) < 0.550;$ $0.590 < \theta gF(B3) < 0.670;$ and $0.007 < \Delta\theta gF(B3) < 0.030,$ where $\theta gF(B2)$ represents a partial dispersion ratio of a material of the single positive lens of the second lens unit, and $\theta gF(B3)$ and $\Delta\theta gF(B3)$ represent a partial dispersion ratio and extraordinary dispersion of the single positive lens of the third lens unit, respectively.

* * * * *